(12) United States Patent
Danilov et al.

(10) Patent No.: US 11,435,910 B2
(45) Date of Patent: Sep. 6, 2022

(54) HETEROGENEOUS MAPPED REDUNDANT ARRAY OF INDEPENDENT NODES FOR DATA STORAGE

(71) Applicant: EMC IP Holding Company LLC, Hopkinton, MA (US)

(72) Inventors: Mikhail Danilov, Saint Petersburg (RU); Yohannes Altaye, Dumfries, VA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/670,715

(22) Filed: Oct. 31, 2019

(65) Prior Publication Data

US 2021/0132828 A1    May 6, 2021

(51) Int. Cl.
*G06F 3/06* (2006.01)
(52) U.S. Cl.
CPC .......... *G06F 3/0631* (2013.01); *G06F 3/0604* (2013.01); *G06F 3/067* (2013.01)
(58) Field of Classification Search
None
See application file for complete search history.

(56) References Cited

U.S. PATENT DOCUMENTS

| | | |
|---|---|---|
| 5,675,802 A | 10/1997 | Allen et al. |
| 5,805,788 A | 9/1998 | Johnson |
| 5,950,225 A | 9/1999 | Kleiman |
| 6,073,218 A | 6/2000 | Dekoning et al. |
| 6,108,684 A | 8/2000 | Dekoning et al. |
| 6,233,696 B1 | 5/2001 | Kedem |
| 6,240,527 B1 | 5/2001 | Schneider et al. |
| 6,502,243 B1 | 12/2002 | Thomas |
| 6,549,921 B1 | 4/2003 | Ofek |
| 7,007,044 B1 | 2/2006 | Rafert et al. |
| 7,103,884 B2 | 9/2006 | Fellin et al. |
| 7,389,393 B1 | 6/2008 | Karr et al. |
| 7,577,091 B2 | 8/2009 | Antal et al. |
| 7,631,051 B1 | 12/2009 | Fein et al. |

(Continued)

OTHER PUBLICATIONS

Non-Final Office Action received for U.S. Appl. No. 16/526,142 dated Oct. 15, 2020, 21 pages.

(Continued)

*Primary Examiner* — Brian R Peugh
(74) *Attorney, Agent, or Firm* — Amin, Turocy & Watson, LLP

(57) ABSTRACT

A mapped redundant array of independent nodes (mapped RAIN) for data storage is disclosed. A mapped RAIN cluster can be allocated on top of one or more real data clusters, wherein the real clusters can comprise storage devices of different storage capacities. Mapping of data storage locations for a mapped RAIN cluster to real storage devices can be based on an affinity value determined for pairs of real nodes of the real data clusters. A normalized affinity can be employed to enable allocation of real storage to mapped nodes of mapped clusters that can be based on the heterogeneous capacities of the storage devices. This can provide improved data availability and data recovery over other techniques where heterogeneity of hardware can make efficient resource allocation a non-trivial task. The disclosed subject matter can facilitate more efficient allocation of Mapped RAINs in a heterogeneous cluster storage construct.

20 Claims, 10 Drawing Sheets

(56) References Cited

U.S. PATENT DOCUMENTS

| | | |
|---|---|---|
| 7,636,814 B1 | 12/2009 | Karr et al. |
| 7,664,839 B1 | 2/2010 | Karr et al. |
| 7,680,875 B1 | 3/2010 | Shopiro et al. |
| 7,694,191 B1 | 4/2010 | Bono et al. |
| 7,721,044 B1 | 5/2010 | Chatterjee et al. |
| 7,653,792 B2 | 6/2010 | Shimada et al. |
| 7,752,403 B1 | 7/2010 | Weinman, Jr. |
| 7,895,394 B2 | 2/2011 | Nakajima et al. |
| 8,125,406 B1 | 2/2012 | Jensen et al. |
| 8,261,033 B1 | 9/2012 | Slik et al. |
| 8,370,542 B2 | 2/2013 | Lu et al. |
| 8,429,514 B1 | 4/2013 | Goel |
| 8,479,037 B1 | 7/2013 | Chatterjee et al. |
| 8,495,465 B1 | 7/2013 | Anholt et al. |
| 8,504,518 B1 | 8/2013 | Ghemawat et al. |
| 8,540,625 B2 | 9/2013 | Miyoshi |
| 8,683,205 B2 | 3/2014 | Resch et al. |
| 8,725,986 B1 | 5/2014 | Goel |
| 8,751,599 B2 | 6/2014 | Tran et al. |
| 8,751,740 B1 | 6/2014 | De Forest et al. |
| 8,751,897 B2 | 6/2014 | Borthakur et al. |
| 8,799,746 B2 | 8/2014 | Baker et al. |
| 8,832,234 B1 | 9/2014 | Brooker et al. |
| 8,856,619 B1 | 10/2014 | Cypher |
| 8,856,624 B1 | 10/2014 | Paniconi |
| 8,892,938 B1 | 11/2014 | Sundaram et al. |
| 8,972,478 B1 | 3/2015 | Storer et al. |
| 9,003,086 B1 | 4/2015 | Schuller et al. |
| 9,021,296 B1 | 4/2015 | Kiselev et al. |
| 9,037,825 B1 | 5/2015 | Donlan et al. |
| 9,052,942 B1 | 6/2015 | Barber et al. |
| 9,063,838 B1 | 6/2015 | Boyle et al. |
| 9,098,447 B1 | 8/2015 | Donlan et al. |
| 9,128,910 B1 | 9/2015 | Dayal et al. |
| 9,208,009 B2 | 12/2015 | Resch et al. |
| 9,218,135 B2 | 12/2015 | Miller et al. |
| 9,244,761 B2 | 1/2016 | Yekhanin et al. |
| 9,268,783 B1 | 2/2016 | Shilane et al. |
| 9,274,903 B1 | 3/2016 | Garlapati et al. |
| 9,280,430 B2 | 3/2016 | Sarfare et al. |
| 9,405,483 B1 | 8/2016 | Wei et al. |
| 9,411,717 B2 | 8/2016 | Goss et al. |
| 9,442,802 B2 | 9/2016 | Hung |
| 9,477,682 B1 | 10/2016 | Bent et al. |
| 9,495,241 B2 | 11/2016 | Flynn et al. |
| 9,619,256 B1 | 4/2017 | Natanzon et al. |
| 9,641,615 B1 | 5/2017 | Robins et al. |
| 9,665,428 B2 | 5/2017 | Vairavanathan et al. |
| 9,747,057 B1 | 8/2017 | Ramani et al. |
| 9,817,713 B2 | 11/2017 | Gupta et al. |
| 9,864,527 B1 | 1/2018 | Srivastav et al. |
| 9,942,084 B1 | 4/2018 | Sorenson, III |
| 9,971,649 B2 | 5/2018 | Dhuse et al. |
| 10,001,947 B1 | 6/2018 | Chatterjee et al. |
| 10,007,561 B1 | 6/2018 | Pudipeddi et al. |
| 10,055,145 B1 | 8/2018 | Danilov et al. |
| 10,061,668 B1 | 8/2018 | Lazier et al. |
| 10,089,026 B1 | 10/2018 | Puhov et al. |
| 10,097,659 B1 | 10/2018 | Rao |
| 10,108,819 B1 | 10/2018 | Donlan et al. |
| 10,127,234 B1 | 11/2018 | Krishnan et al. |
| 10,216,770 B1 | 2/2019 | Kulesza et al. |
| 10,242,022 B1 | 3/2019 | Jain et al. |
| 10,282,262 B2 | 5/2019 | Panara et al. |
| 10,289,488 B1 | 5/2019 | Danilov et al. |
| 10,331,516 B2 | 6/2019 | Danilov et al. |
| 10,361,810 B2 | 7/2019 | Myung et al. |
| 10,387,546 B1 | 8/2019 | Duran et al. |
| 10,496,330 B1 | 12/2019 | Bernat et al. |
| 10,503,611 B1 | 12/2019 | Srivastav et al. |
| 10,567,009 B2 | 2/2020 | Yang et al. |
| 10,579,490 B2 | 3/2020 | Danilov et al. |
| 10,613,780 B1 | 4/2020 | Naeni et al. |
| 10,628,043 B1 | 4/2020 | Chatterjee et al. |
| 10,644,408 B2 | 5/2020 | Sakai et al. |
| 10,671,431 B1 | 6/2020 | Dolan et al. |
| 10,705,911 B2 | 7/2020 | Vishnumolakala et al. |
| 10,733,053 B1 | 8/2020 | Miller et al. |
| 10,740,183 B1 | 8/2020 | Blaum et al. |
| 10,754,845 B2 | 8/2020 | Danilov et al. |
| 10,761,931 B2 | 9/2020 | Goyal et al. |
| 10,797,863 B2 | 10/2020 | Chen et al. |
| 10,846,003 B2 | 11/2020 | Danilov et al. |
| 10,951,236 B2 | 3/2021 | Chen et al. |
| 11,023,331 B2 | 6/2021 | Danilov et al. |
| 2002/0049883 A1 | 4/2002 | Schneider et al. |
| 2002/0166026 A1 | 11/2002 | Ulrich et al. |
| 2002/0191311 A1 | 12/2002 | Ulrich et al. |
| 2003/0016596 A1 | 1/2003 | Chiquoine et al. |
| 2005/0027938 A1 | 2/2005 | Burkey |
| 2005/0071546 A1 | 3/2005 | Delaney et al. |
| 2005/0080982 A1 | 4/2005 | Vasilevsky et al. |
| 2005/0088318 A1 | 4/2005 | Liu et al. |
| 2005/0108775 A1 | 5/2005 | Bachar et al. |
| 2005/0140529 A1 | 6/2005 | Choi et al. |
| 2005/0234941 A1 | 10/2005 | Watanabe |
| 2006/0047896 A1 | 3/2006 | Nguyen et al. |
| 2006/0075007 A1 | 4/2006 | Anderson et al. |
| 2006/0143508 A1 | 6/2006 | Mochizuki et al. |
| 2006/0212744 A1 | 9/2006 | Benner et al. |
| 2006/0265211 A1 | 11/2006 | Canniff et al. |
| 2007/0076321 A1 | 4/2007 | Takahashi et al. |
| 2007/0239759 A1 | 10/2007 | Shen et al. |
| 2007/0250674 A1 | 10/2007 | Findberg et al. |
| 2008/0222480 A1 | 9/2008 | Huang et al. |
| 2008/0222481 A1 | 9/2008 | Huang et al. |
| 2008/0244353 A1 | 10/2008 | Dholakia et al. |
| 2008/0320061 A1 | 12/2008 | Aszmann et al. |
| 2009/0070771 A1 | 3/2009 | Yuyitung et al. |
| 2009/0113034 A1 | 4/2009 | Krishnappa et al. |
| 2009/0132543 A1 | 5/2009 | Chatley et al. |
| 2009/0172464 A1 | 7/2009 | Byrne et al. |
| 2009/0183056 A1 | 7/2009 | Aston |
| 2009/0204959 A1 | 8/2009 | Anand et al. |
| 2009/0240880 A1 | 9/2009 | Kawaguchi |
| 2009/0259882 A1 | 10/2009 | Shellhamer |
| 2010/0031060 A1 | 2/2010 | Chew et al. |
| 2010/0094963 A1 | 4/2010 | Zuckerman et al. |
| 2010/0174968 A1 | 7/2010 | Charles et al. |
| 2010/0218037 A1 | 8/2010 | Swartz et al. |
| 2010/0293348 A1 | 11/2010 | Ye et al. |
| 2010/0332748 A1 | 12/2010 | Van der Goot et al. |
| 2011/0029836 A1 | 2/2011 | Dhuse et al. |
| 2011/0040937 A1 | 2/2011 | Augenstein et al. |
| 2011/0066882 A1 | 3/2011 | Walls et al. |
| 2011/0106972 A1 | 5/2011 | Grube et al. |
| 2011/0107165 A1 | 5/2011 | Resch et al. |
| 2011/0138148 A1 | 6/2011 | Friedman et al. |
| 2011/0161712 A1 | 6/2011 | Athalye et al. |
| 2011/0191536 A1 | 8/2011 | Mizuno et al. |
| 2011/0196833 A1 | 8/2011 | Drobychev et al. |
| 2011/0246503 A1 | 10/2011 | Bender et al. |
| 2011/0292054 A1 | 12/2011 | Boker et al. |
| 2012/0023291 A1 | 1/2012 | Zeng et al. |
| 2012/0096214 A1 | 4/2012 | Lu et al. |
| 2012/0191675 A1 | 7/2012 | Kim et al. |
| 2012/0191901 A1 | 7/2012 | Norair |
| 2012/0204077 A1 | 8/2012 | D'Abreu et al. |
| 2012/0233117 A1 | 9/2012 | Holt et al. |
| 2012/0311395 A1 | 12/2012 | Leggette et al. |
| 2012/0317234 A1 | 12/2012 | Bohrer et al. |
| 2012/0321052 A1 | 12/2012 | Morrill et al. |
| 2013/0013564 A1 | 1/2013 | Ben-Or et al. |
| 2013/0047187 A1 | 2/2013 | Frazier et al. |
| 2013/0054822 A1 | 2/2013 | Mordani et al. |
| 2013/0067159 A1 | 3/2013 | Mehra |
| 2013/0067187 A1 | 3/2013 | Moss et al. |
| 2013/0088501 A1 | 4/2013 | Fell |
| 2013/0097470 A1 | 4/2013 | Hwang et al. |
| 2013/0145208 A1 | 6/2013 | Yen et al. |
| 2013/0238932 A1 | 9/2013 | Resch |
| 2013/0246876 A1 | 9/2013 | Manssour et al. |
| 2013/0290482 A1 | 10/2013 | Leggette |
| 2013/0305365 A1 | 11/2013 | Rubin et al. |

(56) References Cited

U.S. PATENT DOCUMENTS

| | | |
|---|---|---|
| 2014/0040417 A1 | 2/2014 | Galdwin et al. |
| 2014/0064048 A1 | 3/2014 | Cohen et al. |
| 2014/0115182 A1 | 4/2014 | Sabaa et al. |
| 2014/0122745 A1 | 5/2014 | Singh et al. |
| 2014/0149794 A1 | 5/2014 | Shetty et al. |
| 2014/0164430 A1 | 6/2014 | Hadjieleftheriou et al. |
| 2014/0164694 A1 | 6/2014 | Storer |
| 2014/0172930 A1 | 6/2014 | Molaro et al. |
| 2014/0250450 A1 | 9/2014 | Yu et al. |
| 2014/0280375 A1 | 9/2014 | Rawson et al. |
| 2014/0281804 A1 | 9/2014 | Resch |
| 2014/0297955 A1 | 10/2014 | Yamazaki et al. |
| 2014/0304460 A1 | 10/2014 | Carlson, Jr. et al. |
| 2014/0331100 A1 | 11/2014 | Dhuse et al. |
| 2014/0351633 A1 | 11/2014 | Grube et al. |
| 2014/0358972 A1 | 12/2014 | Guarrier et al. |
| 2014/0359244 A1 | 12/2014 | Chambliss et al. |
| 2014/0380088 A1 | 12/2014 | Bennett et al. |
| 2014/0380125 A1 | 12/2014 | Calder et al. |
| 2014/0380126 A1 | 12/2014 | Yekhanin et al. |
| 2015/0006846 A1 | 1/2015 | Youngworth |
| 2015/0074065 A1 | 3/2015 | Christ et al. |
| 2015/0112951 A1 | 4/2015 | Narayanamurthy et al. |
| 2015/0134626 A1 | 5/2015 | Theimer et al. |
| 2015/0142863 A1 | 5/2015 | Yuen et al. |
| 2015/0160872 A1 | 6/2015 | Chen |
| 2015/0178007 A1 | 6/2015 | Moisa et al. |
| 2015/0186043 A1 | 7/2015 | Kesselman et al. |
| 2015/0254150 A1 | 9/2015 | Gordon et al. |
| 2015/0269025 A1 | 9/2015 | Krishnamurthy et al. |
| 2015/0303949 A1 | 10/2015 | Jafarkhani et al. |
| 2015/0331766 A1 | 11/2015 | Sarfare et al. |
| 2015/0370656 A1 | 12/2015 | Tsafrir et al. |
| 2015/0378542 A1 | 12/2015 | Saito et al. |
| 2016/0011935 A1 | 1/2016 | Luby |
| 2016/0011936 A1 | 1/2016 | Luby |
| 2016/0055054 A1 | 2/2016 | Patterson, III et al. |
| 2016/0085645 A1 | 3/2016 | Buzzard et al. |
| 2016/0162378 A1 | 6/2016 | Garlapati et al. |
| 2016/0169692 A1 | 6/2016 | Gupta |
| 2016/0170668 A1 | 6/2016 | Mehra |
| 2016/0217104 A1 | 7/2016 | Kamble et al. |
| 2016/0232055 A1 | 8/2016 | Vairavanathan et al. |
| 2016/0239384 A1 | 8/2016 | Slik |
| 2016/0253400 A1 | 9/2016 | McAlister et al. |
| 2016/0277497 A1 | 9/2016 | Bannister et al. |
| 2016/0292429 A1 | 9/2016 | Bannister et al. |
| 2016/0294419 A1 | 10/2016 | Sandell et al. |
| 2016/0328295 A1 | 11/2016 | Baptist et al. |
| 2016/0357443 A1 | 12/2016 | Li et al. |
| 2016/0357649 A1 | 12/2016 | Karrotu et al. |
| 2016/0371145 A1 | 12/2016 | Akutsu et al. |
| 2016/0378624 A1 | 12/2016 | Jenkins, Jr. et al. |
| 2016/0380650 A1 | 12/2016 | Calder et al. |
| 2017/0003880 A1 | 1/2017 | Fisher et al. |
| 2017/0004044 A1 | 1/2017 | Tormasov et al. |
| 2017/0010944 A1 | 1/2017 | Saito et al. |
| 2017/0017671 A1 | 1/2017 | Baptist et al. |
| 2017/0031945 A1 | 2/2017 | Sarab et al. |
| 2017/0097875 A1 | 4/2017 | Jess et al. |
| 2017/0102993 A1 | 4/2017 | Hu et al. |
| 2017/0115903 A1 | 4/2017 | Franke et al. |
| 2017/0116088 A1 | 4/2017 | Anami et al. |
| 2017/0123914 A1 | 5/2017 | Li et al. |
| 2017/0153946 A1 | 6/2017 | Baptist et al. |
| 2017/0185331 A1 | 6/2017 | Gao et al. |
| 2017/0187398 A1 | 6/2017 | Trusov |
| 2017/0187766 A1 | 6/2017 | Zheng et al. |
| 2017/0206025 A1 | 7/2017 | Viswanathan |
| 2017/0206135 A1 | 7/2017 | Zeng |
| 2017/0212680 A1 | 7/2017 | Waghulde |
| 2017/0212845 A1 | 7/2017 | Conway |
| 2017/0220662 A1 | 8/2017 | Barton et al. |
| 2017/0235507 A1 | 8/2017 | Sinha et al. |
| 2017/0262187 A1 | 9/2017 | Manzanares et al. |
| 2017/0268900 A1 | 9/2017 | Nicolaas et al. |
| 2017/0272209 A1 | 9/2017 | Yanovsky et al. |
| 2017/0285952 A1 | 10/2017 | Danilov et al. |
| 2017/0286009 A1 | 10/2017 | Danilov et al. |
| 2017/0286436 A1 | 10/2017 | Neporada et al. |
| 2017/0286516 A1 | 10/2017 | Horowitz et al. |
| 2017/0288701 A1 | 10/2017 | Slik et al. |
| 2017/0344285 A1 | 11/2017 | Choi et al. |
| 2018/0052744 A1 | 2/2018 | Chen et al. |
| 2018/0063213 A1 | 3/2018 | Bevilacqua-Linn et al. |
| 2018/0074753 A1 | 3/2018 | Ober |
| 2018/0074881 A1 | 3/2018 | Burden |
| 2018/0088857 A1 | 3/2018 | Gao et al. |
| 2018/0107415 A1 | 4/2018 | Motwani et al. |
| 2018/0121286 A1 | 5/2018 | Sipos |
| 2018/0129417 A1 | 5/2018 | Sivasubramanian et al. |
| 2018/0129600 A1 | 5/2018 | Ishiyama et al. |
| 2018/0181324 A1 | 6/2018 | Danilov et al. |
| 2018/0181475 A1 | 6/2018 | Danilov et al. |
| 2018/0181612 A1 | 6/2018 | Danilov et al. |
| 2018/0217888 A1 | 8/2018 | Colgrove et al. |
| 2018/0246668 A1 | 8/2018 | Sakashita et al. |
| 2018/0267856 A1 | 9/2018 | Hayasaka et al. |
| 2018/0267985 A1 | 9/2018 | Badey et al. |
| 2018/0293017 A1 | 10/2018 | Curley et al. |
| 2018/0306600 A1 | 10/2018 | Nicolaas et al. |
| 2018/0307560 A1 | 10/2018 | Vishnumolakala et al. |
| 2018/0341662 A1 | 11/2018 | He |
| 2018/0375936 A1 | 12/2018 | Chirammal et al. |
| 2019/0028179 A1 | 1/2019 | Kalhan |
| 2019/0034084 A1 | 1/2019 | Nagarajan et al. |
| 2019/0043201 A1 | 2/2019 | Strong et al. |
| 2019/0043351 A1 | 2/2019 | Yang et al. |
| 2019/0050301 A1 | 2/2019 | Juniwal et al. |
| 2019/0065092 A1 | 2/2019 | Shah et al. |
| 2019/0065310 A1 | 2/2019 | Rozas |
| 2019/0102103 A1 | 4/2019 | Ari et al. |
| 2019/0114223 A1 | 4/2019 | Pydipaty et al. |
| 2019/0129644 A1 | 5/2019 | Gao et al. |
| 2019/0188079 A1 | 6/2019 | Kohli |
| 2019/0205437 A1 | 7/2019 | Larson et al. |
| 2019/0215017 A1 | 7/2019 | Danilov et al. |
| 2019/0220207 A1 | 7/2019 | Lingarajappa |
| 2019/0342418 A1 | 11/2019 | Eda et al. |
| 2019/0356416 A1 | 11/2019 | Yanovsky et al. |
| 2019/0384500 A1 | 12/2019 | Danilov et al. |
| 2019/0386683 A1 | 12/2019 | Danilov et al. |
| 2020/0004447 A1 | 1/2020 | Danilov et al. |
| 2020/0026810 A1 | 1/2020 | Subramaniam et al. |
| 2020/0034339 A1 | 1/2020 | Gershaneck et al. |
| 2020/0034471 A1 | 1/2020 | Danilov et al. |
| 2020/0042178 A1 | 2/2020 | Danilov et al. |
| 2020/0050510 A1 | 2/2020 | Chien et al. |
| 2020/0104377 A1 | 4/2020 | Earnesty, Jr. et al. |
| 2020/0117547 A1 | 4/2020 | Danilov et al. |
| 2020/0117556 A1 | 4/2020 | Zou et al. |
| 2020/0145511 A1 | 5/2020 | Gray et al. |
| 2020/0151353 A1 | 5/2020 | Struttmann |
| 2020/0204198 A1 | 6/2020 | Danilov et al. |
| 2021/0019067 A1 | 1/2021 | Miller et al. |
| 2021/0019093 A1 | 1/2021 | Karr et al. |
| 2021/0019237 A1 | 1/2021 | Karr et al. |
| 2021/0034268 A1 | 2/2021 | Hara et al. |
| 2021/0096754 A1 | 4/2021 | Danilov et al. |
| 2021/0132851 A1 | 5/2021 | Danilov et al. |
| 2021/0133049 A1 | 5/2021 | Danilov et al. |
| 2021/0218420 A1 | 7/2021 | Danilov et al. |
| 2021/0255791 A1 | 8/2021 | Shimada et al. |
| 2021/0273660 A1 | 9/2021 | Danilov et al. |

OTHER PUBLICATIONS

Notice of Allowance received U.S. Appl. No. 16/228,612 date Oct. 20, 2020, 84 pages.

Zhou, et al. "Fast Erasure Coding for Data Storage: A Comprehensive Study of the Acceleration Techniques" Proceedings of the 17th Usenix Conference on File and Storage Technologies (FAST '19),

(56) References Cited

OTHER PUBLICATIONS

[https://www.usenix.org/conference/fast19/presentation/zhou], Feb. 2019, Boston, MA, USA. 14 pages.
Non-Final Office Action received for U.S. Appl. No. 16/010,255 dated Oct. 29, 2020, 65 pages.
Final Office Action received for U.S. Appl. No. 16/240,272 dated Oct. 27, 2020, 42 pages.
Non-Final Office Action received for U.S. Appl. No. 16/399,902 dated Oct. 28, 2020, 83 pages.
Notice of Allowance received for U.S. Appl. No. 16/374,726 dated Nov. 20, 2020, 78 pages.
Final Office Action received for U.S. Appl. No. 16/228,624 dated Dec. 1, 2020, 63 pages.
Non-Final Office Action received for U.S. Appl. No. 16/570,657 dated Nov. 27, 2020, 75 pages.
Final Office Action received for U.S. Appl. No. 16/177,285 dated Dec. 30, 2020, 61 pages.
Final Office Action received for U.S. Appl. No. 16/511,161 dated Dec. 30, 2020, 61 pages.
Non-Final Office Action received for U.S. Appl. No. 16/399,895 dated Jan. 4, 2021, 64 pages.
Notice of Allowance received for U.S. Appl. No. 16/374,726 dated Jan. 6, 2021, 56 pages.
Non-Final Office Action received for U.S. Appl. No. 16/209,185 dated Jun. 18, 2020, 22 pages.
Martin Hosken, Developing a Hyper-Converged Storage Strategy for VMware vCloud Director with VMware vSAN, Jan. 2018 (Year 2018).
Non-Final Office Action received for U.S. Appl. No. 16/261,549 dated Apr. 15, 2020, 22 pages.
Non-Final Office Action received for U.S. Appl. No. 16/374,726 dated Jun. 2, 2020, 47 pages.
Matarajan, RAID 0, RAID 1, RAID 5, RAID 10 Explained with Diagrams, Aug. 10, 2010, thegeekstuff.com (18 pages).
Non-Final Office Action received for U.S. Appl. No. 16/177,285 dated Jul. 22, 2020, 31 pages.
Non-Final Office Action received for U.S. Appl. No. 16/261,547 dated Sep. 3, 2020, 26 pages.
Non-Final Office Action received for U.S. Appl. No. 16/261,548 dated Aug. 21, 2020, 42 pages.
Notice of Allowance received for U.S. Appl. No. 16/261,549 dated Jul. 17, 2020, 40 pages.
Qiang et al., "Dynamics Process of Long-running Allocation/Collection in Linear Storage Space", International Conference on Networking, Architecture, and Storage (NAS 2007), Guilin, 2007, pp. 209-216.
Non-Final Office Action received for U.S. Appl. No. 16/374,725 dated Aug. 19, 2020, 50 pages.
Non-Final Office Action received for U.S. Appl. No. 16/511,161 dated Jul. 10, 2020, 24 pages.
Notice of Allowance received for U.S. Appl. No. 15/862,547 dated Mar. 29, 2019, 27 pages.
Non-Final Office Action received for U.S. Appl. No. 15/792,714 dated Apr. 4, 2019, 20 pages.
Final Office Action received for U.S. Appl. No. 15/792,714 dated Sep. 12, 2019, 43 pages.
Wikipedia "Garbage Collection", URL: https://en.wikipedia.org/wiki/Garbage_collection_(computer science)#Availability (Year: 2017) retrieved using the WayBackMachine, Sep. 8, 2017, 8 pages.
Wikipedia "Erasure code", URL: https://web.archive.org/web/20170908171158/https://en.wikipedia.org/wiki/Erasure_code (Year: 2017), retrieved using the WayBackMachine, Sep. 8, 2017, 5 pages.
Wikipedia "Front and back ends" URL: https://en.wikipedia.org/wiki/Front_and_back_ends (Year:2019), Sep. 6, 2019, 4 pages.
Notice of Allowance received for U.S. Appl. No. 15/792,714 dated Nov. 8, 2019, 31 pages.
Non-Final Office Action received for U.S. Appl. No. 15/791,390 dated Sep. 20, 2019, 27 pages.
Final Office Action received for U.S. Appl. No. 15/791,390 dated Feb. 6, 2020, 29 pages.
Non-Final Office Action received for U.S. Appl. No. 15/791,390 dated Apr. 30, 2020, 48 pages.
Huang et al., "Scale-RS: An Efficient Scaling Scheme for RS-Coded Storage Clusters," in IEEE Transactions on Parallel and Distributed Systems, vol. 26, No. 6, pp. 1704-1717, Jun. 1, 2015.
Non-Final Office Action received for U.S. Appl. No. 16/457,615 dated Jul. 20, 2020, 34 pages.
Non-Final Office Action received for U.S. Appl. No. 15/651,504 dated Mar. 21, 2019, 10 pages.
Non-Final Office Action received for U.S. Appl. No. 15/662,273 dated Nov. 16, 2018, 19 pages.
Final Office Action received for U.S. Appl. No. 15/662,273 dated May 15, 2019, 33 pages.
Non-Final Office Action received for U.S. Appl. No. 15/965,479 dated Apr. 15, 2019, 21 pages.
Non-Final Office Action received for U.S. Appl. No. 15/794,950 dated Jul. 9, 2019, 29 pages.
Final Office Action received for U.S. Appl. No. 15/651,504 dated Sep. 18, 2019, 15 pages.
Non-Final Office Action received for U.S. Appl. No. 15/952,179 dated Sep. 10, 2019, 42 pages.
Wikipedia, "Standard Raid Levels—RAID 6", URL: https://en.wikipedia.org/wiki/Standard_RAID_levels#RAID_6, Oct. 18, 2019, 11 pages.
Non-Final Office Action received for U.S. Appl. No. 15/656,382 dated Nov. 1, 2019, 47 pages.
Final Office Action received for U.S. Appl. No. 15/952,179 dated Nov. 26, 2019, 53 pages.
Non Final Office Action received for U.S. Appl. No. 16/024,314 dated Nov. 25, 2019, 42 pages.
Non-Final Office Action received for U.S. Appl. No. 16/177, 278 dated Dec. 2, 2019, 55 pages.
Non-Final Office Action received for U.S. Appl. No. 15/651,504 dated Dec. 31, 2019, 18 pages.
Non-Final Office Action received for U.S. Appl. No. 16/010,246 dated Dec. 5, 2019, 67 pages.
Stonebreaker et al. "Distributed RAID—A New Multiple Copy Algorithm.", IEEE ICDE, 1990, pp. 430-437.
Muralidhar et al. "f4: Facebook's Warm BLOB Storage System", USENIX. OSDI, Oct. 2014, pp. 383-398.
Final Office Action dated Feb. 12, 2020 for U.S. Appl. No. 16/024,314, 29 pages.
Non-Final Office Action received for U.S. Appl. No. 16/010,255 dated Jan. 9, 2020, 31 pages.
Office Action dated Feb. 5, 2020 for U.S. Appl. No. 16/261,551, 30 pages.
Non-Final Office Action received for U.S. Appl. No. 16/228,612 dated Feb. 27, 2020, 49 pages.
Final Office Action received for U.S. Appl. No. 16/010,246 dated Mar. 16, 2020, 33 pages.
Final Office Action received for U.S. Appl. No. 15/656,382 dated Apr. 6, 2020, 31 pages.
Non-Final Office Action received for U.S. Appl. No. 15/582,167 dated Sep. 7, 2018, 19 pages.
Non-Final Office Action received for U.S. Appl. No. 15/952,179 dated Apr. 20, 2020, 68 pages.
Notice of Allowance received for U.S. Appl. No. 16/240,193, dated May 4, 2020, 46 pages.
Final Office Action received for U.S. Appl. No. 16/177,278, dated May 11, 2020, 53 pages.
Non-Final Office Action received for U.S. Appl. No. 16/231,018 dated May 8, 2020, 78 pages.
Notice of Allowance dated May 11, 2020 for U.S. Appl. No. 16/240,193, 24 pages.
Non-Final Office Action received for U.S. Appl. No. 16/228,624 dated Jun. 24, 2020, 65 pages.
Non-Final Office Action received for U.S. Appl. No. 16/240,272 dated Jun. 29, 2020, 64 pages.
Non-Final Office Action received for U.S. Appl. No. 16/228,612 dated Jun. 29, 2020, 62 pages.
Final Office Action received for U.S. Appl. No. 16/010,255 dated Jul. 23, 2020, 36 pages.

(56) References Cited

OTHER PUBLICATIONS

Office Action received for U.S. Appl. No. 16/010,246 dated Jul. 27, 2020 36 pages.
Office Action received for U.S. Appl. No. 16/177,278, dated Aug. 21, 2020, 53 pages.
Office Action received for U.S. Appl. No. 16/179,486, dated Aug. 13, 2020, 64 pages.
Guo et al., "GeoScale: Providing Geo-Elasticity in Distributed Clouds" 2016 IEEE International Conference on Cloud Engineering, 4 pages.
Guo et al., "Providing Geo-Elasticity in Geographically Distributed Clouds". ACM Transactions on Internet Technology, vol. 18, No. 3, Article 38. Apr. 2018. 27 pages.
Office Action received for U.S. Appl. No. 16/254,073, dated Aug. 18, 2020, 62 pages.
Notice of Allowance received for U.S. Appl. No. 16/726,428 dated Jun. 14, 2021, 34 pages.
Non-Final Office Action received for U.S. Appl. No. 16/698,096 dated May 24, 2021, 62 pages.
Non-Final Office Action received for U.S. Appl. No. 16/745,855 dated May 13, 2021, 71 pages.
Non-Final Office Action received for U.S. Appl. No. 16/834,649 dated Jun. 24, 2021, 61 pages.
Non-Final Office Action received for U.S. Appl. No. 16/179,486 dated May 12, 2021, 50 pages.
Non-Final Office Action received for U.S. Appl. No. 16/570,657 dated May 12, 2021, 79 pages.
Non-Final Office Action received for U.S. Appl. No. 16/670,765 dated Jul. 20, 2021, 79 pages.
Thomasian et al., "Hierarchical RAID: Design, performance, reliability, and recovery", J. Parallel Distrib. Comput. vol. 72 (2012) pp. 1753-1769.
Non-Final Office Action received for U.S. Appl. No. 16/399,897 dated Feb. 19, 2021, 56 pages.
Final Office Action received for U.S. Appl. No. 16/177,278 dated Feb. 24, 2021, 109 pages.
EMC; "EMC ECS (Elastic Cloud Storage) Architectural Guide v2.x;" EMC; Jun. 2015; available at: https://www.dell.com/community/s/vjauj58549/attachments/vjauj58549/solutions-ch/477 /1/h14071-ecs-architectural-guide-wp.pdf, Jun. 2015, 21 pages.
Mohan et al., "Geo-aware erasure coding for high-performance erasure-coded storage clusters", Springer Link, URL: https://link.springer.com/article/10.1007/s 12243-017-0623-2, Jan. 18, 2018.
Final Office Action received for U.S. Appl. No. 16/179,486 dated Jan. 28, 2021, 55 pages.
Non-Final Office Action received for U.S. Appl. No. 16/670,746 dated Feb. 16, 2021, 55 pages.
Dell Technologies, "ECS Overview and Architecture", h14071.18, Feb. 2021, 55 Pages.
EMC; "EMC ECD (Elastic Cloud Storage) Architectural Guide v2.x;" EMC; Jun. 2015; available at: https://www.dell.com/community/s/vjauj58549/attachments/vjauj58549/solutions-ch/477 /1/h14071-ecs-architectural-guide-wp.pdf, Jun. 2015, 21 pages.
Non-Final Office Action received for U.S. Patent Application Serial No. 16/177,285 dated Apr. 9, 2021, 41 pages.
Non-Final Office Action received for U.S. Appl. No. 16/779,208 dated Apr. 20, 2021, 71 pages.
Notice of Allowance received for U.S. Appl. No. 16/570,657 dated Sep. 7, 2021, 65 pages.
Ma et al., "An Ensemble of Replication and Erasure Codes for Cloud File Systems", Proceedings—IEEE INFOCOM, Apr. 2013, pp. 1276-1284.
Final Office Action received for U.S. Appl. No. 16/698,096 dated Sep. 7, 2021, 24 pages.
Final Office Action received for U.S. Appl. No. 16/177,285 dated Sep. 14, 2021, 65 pages.
Final Office Action received for U.S. Appl. No. 16/179,486 dated Oct. 20, 2021, 46 pages.
Notice of Allowance dated Sep. 10, 2021 for U.S. Appl. No. 16/745,855, 30 pages.
Office Action dated Nov. 24, 2021 for U.S. Appl. No. 16/526,182, 83 pages.
Notice of Allowance dated Nov. 22, 2021 for U.S. Appl. No. 16/888,144, 71 pages.
Office Action dated Apr. 13, 2021 for U.S. Appl. No. 16/781,316, 21 pages.
Non-Final Office Action received for U.S. Appl. No. 16/698,096 dated Jan. 5, 2022, 21 pages.
Non-Final Office Action received for U.S. Appl. No. 16/834,649 dated Jan. 28, 2022, 26 pages.
Office Action dated Feb. 8, 2022 for U.S. Appl. No. 16/986,222, 62 pages.
Office Action dated Nov. 24, 2021 for U.S. Appl. No. 16/538,984, 30 pages.
Non-Final Office Action received for U.S. Appl. No. 16/584,800 dated Mar. 3, 2022, 90 pages.
Non-Final Office Action received for U.S. Appl. No. 16/403,417 dated Feb. 25, 2022, 100 pages.
Non-Final Office Action received for U.S. Appl. No. 17/153,602 dated Mar. 16, 2022, 40 pages.
Notice of Allowance received for U.S. Appl. No. 17/333,793 dated Mar. 9, 2022, 39 pages.
Sun et al., "Data Management across Geographically-Distributed Autonomous Systems: Architecture, Implementation, and Performance Evaluation," IEEE Transactions on Industrial Informatics, 2019, 9 pages.
Notice of Allowance dated May 16, 2022 for U.S. Appl. No. 16/526,182, 54 pages.
Notice of Allowance dated Jun. 27, 2022 for U.S. Appl. No. 16/584,800, 33 pages.
Office Action dated Jun. 17, 2022 for U.S. Appl. No. 16/986,222, 76 pages.
Office Action dated Jul. 14, 2022 for U.S. Appl. No. 17/153,602, 34 pages.
Office Action dated Jun. 1, 2022 for U.S. Appl. No. 16/538,984, 114 pages.
Notice of Allowance dated Jun. 27, 2022 for U.S. Appl. No. 17/333,815, 10 pages.
Notice of Allowance dated Jun. 8, 2022 for U.S. Appl. No. 16/179,486, 67 pages.

HETEROGENEOUS MAPPED REDUNDANT ARRAY OF INDEPENDENT NODES FOR DATA STORAGE

TECHNICAL FIELD

The disclosed subject matter relates to data storage, more particularly, to mapping storage pools comprising storage devices of different capacities in at least one array of storage devices.

BACKGROUND

Conventional data storage techniques can store data in one or more arrays of data storage devices. As an example, data can be stored in an ECS (formerly known as ELASTIC CLOUD STORAGE) system, hereinafter ECS system, such as is provided by DELL EMC. The example ECS system can comprise data storage devices, e.g., disks, etc., arranged in nodes, wherein nodes can be comprised in an ECS cluster. One use of data storage is in bulk data storage. Data can conventionally be stored in a group of nodes format for a given cluster, for example, in a conventional ECS system, all disks of nodes comprising the group of nodes are considered part of the group. As such, a node with many disks can, in some conventional embodiments, comprise a large amount of storage that can go underutilized. As an example, a storage group of five nodes, with ten disks per node, at 8 terabytes (TBs) per disk is roughly 400 TB in size. This can be excessively large for some types of data storage, however apportioning smaller groups, e.g., fewer nodes, less disks, smaller disks, etc., can be inefficient in regards to processor and network resources, e.g., computer resource usage, to support these smaller groups. As such, it can be desirable to have more granular logical storage groups that can employ portions of larger real groups, thereby facilitating efficient computer resource usage, e.g., via larger real groups, but still providing smaller logical groups that can be used more optimally for storing smaller amounts of data therein. Furthermore, it can be desirable to manage storage to efficiently consume storage space, more particularly in real groups compromising storage devices of differing capacities.

DETAILED DESCRIPTION

Figure 1:
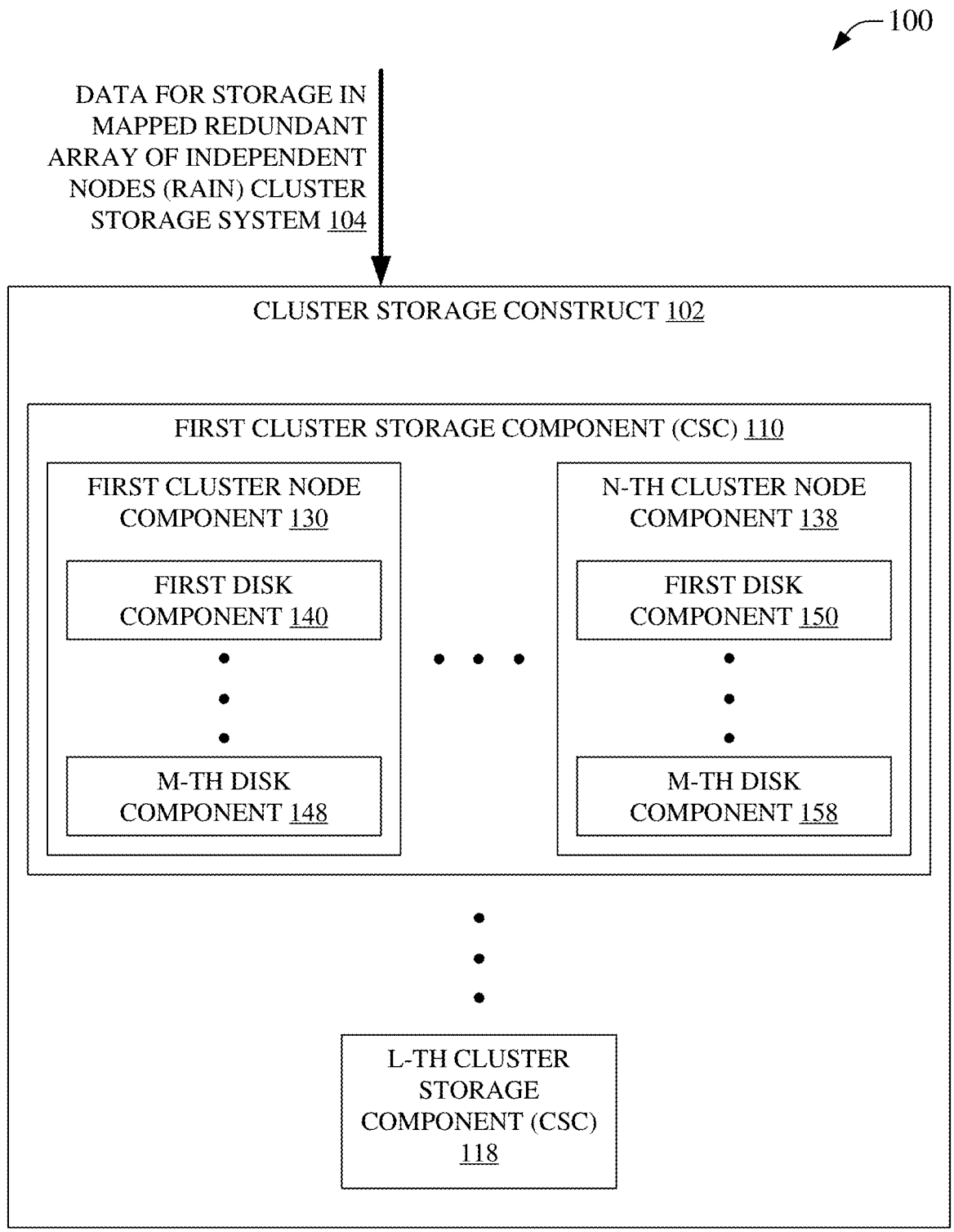
FIG. 1 is an illustration of an example system that can facilitate storage of data in a mapped redundant array of independent nodes, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned, data storage techniques can conventionally store data in one or more arrays of data storage devices. As an example, data can be stored in an ECS system such as is provided by DELL EMC. The example ECS system can comprise data storage devices, e.g., disks, etc., arranged in nodes, wherein nodes can be comprised in an ECS cluster. One use of data storage is in bulk data storage. Data can conventionally be stored in a group of nodes format for a given cluster, for example, in a conventional ECS system, all disks of nodes comprising the group of nodes are considered part of the group. As such, a node with many disks can, in some conventional embodiments, comprise a large amount of storage that can go underutilized. As such, it can be desirable to have more granular logical storage groups that can employ portions of larger real groups, thereby facilitating efficient computer resource usage, e.g., via larger real groups, but still providing smaller logical groups that can be used more efficiently for storing smaller amounts of data therein.

In an embodiment of the presently disclosed subject matter, a mapped redundant array of independent nodes, hereinafter a mapped RAIN, can comprise a mapped cluster, wherein the mapped cluster comprises a logical arrangement of real storage devices. In a mapped cluster, a real cluster(s), e.g., a group of real storage devices comprised in one or more hardware nodes, comprised in one or more clusters, can be defined so allow more granular use of the real cluster in contrast to conventional storage techniques. In an aspect, a mapped cluster can comprise nodes that provide data redundancy, which, in an aspect, can allow for failure of a portion of one or more nodes of the mapped cluster without loss of access to stored data, can allow for removal/addition of one or more nodes from/to the mapped cluster without loss of access to stored data, etc. As an example, a mapped cluster can comprise nodes having a data redundancy scheme analogous to a redundant array of independent disks (RAID) type-6, e.g., RAID6, also known as double-parity RAID, etc., wherein employing a node topology and two parity stripes on each node can allow for two node failures before any data of the mapped cluster becomes inaccessible, etc. In other example embodiments, a mapped cluster can employ other node topologies and parity techniques to provide data redundancy, e.g., analogous to RAID0, RAID1, RAID2, RAID3, RAID4, RAID5, RAID6, RAID0+1, RAID1+0, etc., wherein a node of a mapped cluster can comprise one or more disks, and the node can be loosely similar to a disk in a RAID system. Unlike RAID technology, an example mapped RAIN system can provide access to more granular storage in generally very large data storage systems, often on the order of terabytes, petabytes, exabytes, zettabytes, etc., or even larger, because each node can generally comprise a plurality of disks, unlike RAID technologies.

In an embodiment, software, firmware, etc., can hide the abstraction of mapping nodes in a mapped RAIN system, e.g., the group of nodes can appear to be a contiguous block of data storage even where, for example, it can be spread across multiple portions of one or more real disks, multiple real groups of hardware nodes (a real RAIN), multiple real clusters of hardware nodes (multiple real RAINs), multiple geographic locations, etc. For a given real cluster, e.g., real RAIN, that is N nodes wide and M disks deep, a mapped RAIN can consist of up to N' mapped nodes and manage up to M' portions of disks of the constituent real nodes. Accordingly, in an embodiment, one mapped node is expected to manage disks of different real nodes. Similarly, in an embodiment, disks of one real node are expected to be managed by mapped nodes of different mapped RAIN clusters. In some embodiments, the use of two disks by one real node can be forbidden to harden mapped RAIN clusters against a failure of one real node compromising two or more mapped nodes of one mapped RAIN cluster, e.g., a data loss event, etc. Hereinafter, a portion of a real disk can be comprised in a real node that can be comprised in a real cluster and, furthermore, a portion of the real disk can correspond to a portion of a mapped disk, a mapped disk can comprise one or more portions of one or more real disks, a mapped node can comprise one or more portions of one or more real nodes, a mapped cluster can comprise one or more portions of one or more real clusters, etc., and, for convenience, the term RAIN can be omitted for brevity, e.g., a mapped RAIN cluster can be referred to simply as a mapped cluster, a mapped RAIN node can simply be referred to as a mapped node, etc., wherein 'mapped' is intended to convey a distinction from a corresponding real physical hardware component.

In an embodiment, a mapped cluster can be comprised in a real cluster, e.g., the mapped cluster can be N' by M' in size and the real cluster can be N by M in size, where N'=N and where M'=M. In other embodiments, N' can be less than, or equal to, N, and M' can be less than, or equal to, M. It will be noted that in some embodiments, M' can be larger than M, e.g., where the mapping of a M real disks into M' mapped disks portions comprises use of a part of one of the M disks, for example, where 10 real disks (M=10) are mapped into 17 mapped disk portions (M'=17), 11 mapped disk portions (M'=11), 119 mapped disk portions (M'=119), etc. In these other embodiments, the mapped cluster can be smaller than the real cluster. Moreover, where the mapped cluster is sufficiently small in comparison to the real cluster, the real cluster can accommodate one or more additional mapped clusters. In an aspect, where mapped cluster(s) are smaller than a real cluster, the mapped cluster can provide finer granularity of the data storage system. As an example, where the real cluster is 8×8, e.g., 8 nodes by 8 disks, then, for example, four mapped 4×4 clusters can be provided, wherein each of the four mapped 4×4 clusters is approximately ¼th the size of the real cluster. As a second example, given an 8×8 real cluster 16 mapped 2×2 clusters can be provided where each mapped cluster is approximately ¹⁄₁₆th the size of the real cluster. As a third example, for the 8×8 real cluster, 2 mapped 4×8 or 8×4 clusters can be provided and each can be approximately ½ the size of the real cluster. Additionally, the example 8×8 real cluster can provide a mix of different sized mapped clusters, for example one 8×4 mapped cluster, one 4×4 mapped cluster, and four 2×2 mapped clusters. In some embodiments, not all of the real cluster must be comprised in a mapped cluster, e.g., an example 8×8 real cluster can comprise only one 2×4 mapped cluster with the rest of the real cluster not (yet) being allocated into mapped storage space.

Other aspects of the disclosed subject matter provide additional features generally not associated with real cluster data storage. In some embodiments, a mapped cluster can comprise storage space from more than one real cluster. In some embodiments, a mapped cluster can comprise storage space from real nodes in different geographical areas. In some embodiments, a mapped cluster can comprise storage space from more than one real cluster in more than one geographic location. As an example, a mapped cluster can comprise storage space from a cluster having hardware nodes in a data center in Denver. In a second example, a mapped cluster can comprise storage space from a first cluster having hardware nodes in a first data center in Denver and from a second cluster also having hardware nodes in the first data center in Denver. As a further example, a mapped cluster can comprise storage space from both a cluster having hardware nodes in a first data center in Denver and a second data center in Denver. As a further example, a mapped cluster can comprise storage space from a first cluster having hardware nodes in a first data center in Seattle, Wash., and a second data center having hardware nodes in Tacoma, Wash. As another example, a mapped cluster can comprise storage space from a first cluster having hardware nodes in a first data center in Houston, Tex., and a second cluster having hardware nodes in a data center in Mosco, Russia.

In an embodiment, a real cluster can comprise storage devices of different capacities. As an example, a real cluster can comprise a first storage device of a first capacity and a second storage device of a second capacity different from the first capacity. In an embodiment, a first node can comprise storage devices of a first capacity and a second node can comprise storage devices of a second capacity different from the first capacity, e.g., the first capacity can be one unit of storage and the second capacity can be two units of storage; the first capacity can be one unit of storage and the second capacity can be half a unit of storage; etc. As an example, a first real node can comprise disks of 10 TB and a second real node can comprise disks of 20 TB. In an aspect, a node can also comprise storage devices of different capacities, e.g., a first node can comprise first disks of first capacity and second disks of second capacity, etc.

In an aspect, a mapped RAIN can have a higher level of availability for data stored on the mapped RAIN when the data is stored in a more dispersed manner across the real storage devises corresponding to the mapped RAIN, e.g., storing data across more storage devices of a real RAIN generally corresponds to the data remaining more available, e.g., where portions of the real RAIN become less accessible, more of the data remains available because more of that data is stored on other portions of the real RAIN that are not less accessible. This can be treated as a best practice, e.g., a mapped RAIN can be directed to manage disks that are connected to a greatest number of real nodes of a real RAIN as possible, e.g., the mapped disks can be distributed across as many real nodes as possible. This practice is possible because storage services of mapped nodes can move between real nodes and therefore mapping of storage services is not relevant to the success of the disclosed subject matter. As an example, if data is stored evenly in two real nodes via an example mapped node, then if one of the two real nodes becomes less accessible, half of the data can become less accessible. In contrast, if the data is evenly stored in eight real nodes via the example mapped node, then if one of the eight real nodes becomes less accessible, then up to ⅛th of the data can become less accessible, e.g., the more real nodes used to evenly store the data of the example mapped node, the less data is at risk of becoming less accessible. This can be regarded as a best practice in relation to data availability as the mapped RAIN level.

In another aspect, data availability at a system level can also be considered. Data can be stored in a manner allowing for recovery of data, e.g., data can be stored in a protection set comprising data and recovery data. Recovery data can enable recovery of data that is compromised. As an example, a protection set can comprise data and a copy of the data, e.g., the copy of the data can be recovery data, such that where a portion of the data is less accessible, e.g., lost, damaged, inaccessible, etc., then a corresponding portion can be accessed in the copy of the data. In practice, a protection set can comprise nearly any type of recovery data, e.g., redundant data, duplicate data, erasure coding data, etc., to enable data recovery without departing from the scope of the disclosed subject matter. Typically, a protection set can be stored such that recovery of less accessible data can be successful, e.g., in the example where recovery data is a copy of data, then typically the recovery data would not be stored on the same storage device as the data because failure of the storage device would then compromise both the data and the corresponding recovery data, rather, the recovery data can be stored appropriately to allow recovery of the data, e.g., the recovery data can be stored on a different storage device, different node, different cluster, different geographical location, etc. From the system perspective, a failure of a real node comprising data stored via a mapped node can be recovered from by performing data recovery from other real nodes comprising recovery data.

In an aspect, a mapped RAIN can have an "affinity" with real nodes that having storage devices participating in the mapped RAIN. Accordingly, from the system level, a best practice can be to have greater affinities, e.g., it can be desirable for data stored via a mapped node to be stored on a greatest number of real nodes, such that the mapped node can be said to have a higher affinity when data is stored across more real nodes. In an aspect, affinity can be determined between real nodes, real disks, etc., e.g., an affinity between two real nodes occurs when they both participate in supporting a same mapped RAIN. Thus, where a real node fails, e.g., becomes less accessible, a greater number of other real nodes can participate in recovery of the corresponding less accessible data. Where more real nodes participate in the recovery of the less accessible data, typically more processors, etc., can be tasked with recovery of portions of the less accessible data and, moreover, each of the participating real nodes can need to recover a smaller portion of the less accessible data. This, in turn, can result in a shorter duration of recovery, a faster recovery, etc. As an example, where one unit of data become less accessible and recovery is across two other real nodes, then the processors of the two other real nodes can each recover half of the less accessible data. However, in this example, if the one unit of data is protected across 10 other real nodes, e.g., has an affinity of 10 rather than two, then the processors of the 10 other real nodes can each recover ¹⁄₁₀th of the less accessible data. In these examples, if each real node has one processor, then in the affinity=2 example, two processors are tasked with recovering the data and, in the affinity=10 example, 10 processors are tasked with recovering the same volume of data. Assuming that 10 processors can recover one unit of data faster than two processors, the greater affinity can recover faster. Similarly, each processor in the above examples can also be viewed as needing to recover less of the data in the high affinity example, e.g., each processor can recover ¹⁄₁₀th of the data in the high affinity example, compared to ½ of the data in the lower affinity example. Where recovery is faster, a probability of multiple simultaneous failures can be reduced, e.g., if a mean time between failures is 4 time units, '4t', and recovery of one unit of data takes 10 units of time, then in the low affinity example above, recovery of the one unit of data in 5t, e.g., each of the two processors can recover ½ of the data in 5t. As such, where 5t>4t, a second failure can have occurred before completion of the recovery process in the low affinity example. This can lead to real data loss events. However, in the high affinity example, recovery can occur in 1t, e.g., each of the 10 processors can recover ¹⁄₁₀th of the data in 1t. This can result in the data being fully recovered prior to a next failure event, e.g., 1t<4t. Accordingly, the next failure is less likely to cause a data loss event.

In an aspect, high affinities can be associated with widely distributing storage across real nodes, real devices, etc. In the disclosed subject matter, it is observed that, in a heterogeneous storage device environment, e.g., where storage devices of a real cluster can be of different capacities, an affinity between two real nodes can be measured in capacity units. The affinity between two real nodes can then be defined as amount of capacity the two real nodes donate to one or more same mapped RAINs. The concept of affinity between nodes can be especially valuable for large real clusters that run sets of small and medium-sized mapped clusters because such systems to have some of the real nodes serving different groups of mapped clusters. In an aspect, an even distribution of affinity for real clusters can be desirable where the real nodes manage the same amount of storage capacity, including when the real clusters comprise heterogeneous storage device capacities, e.g., the disks of the real cluster can be of different sizes. In an aspect, where real nodes manage different amounts of storage capacity, even distribution of affinity may give unsatisfactory results from a resource utilization point of view. In an example, where one real node comprises disks of 10 TB and another real node comprises disks of 2 TB, disk level affinity, e.g., each node contributes an even number of disks, can result in uneven storage of the data, inefficient data storage, etc. In the instant example, if each real node donates 1 disk, then an even distribution of data would store up to 2 TB of data on each of the disks, which can waste up to 8 TB of data on the 10 TB disk. Similarly, in the instant example, if each of the donated disks is used efficiently, then five times more data is stored on the 10 TB disk compared to the 2 TB disk and the data storage can be regarded as being uneven, which can result in difficulty recovering less accessible data, etc., e.g., if the 10 TB disk becomes less accessible, then the data stored on the 2 TB disk can, in some instances, be insufficient to recover the 10 TB of data, etc. Moreover, the prohibition against mapping disks of one real node to more than one mapped node of the same mapped cluster can also result in inefficient allocation of storage resources where affinity is performed at the disk level rather than the capacity level.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate storage of data in a mapped redundant array of independent nodes, in accordance with aspects of the subject disclosure. System 100 can comprise a cluster storage construct 102, which can be embodied in a cluster storage system. In an embodiment, cluster storage construct 102 can be embodied in a real cluster storage system comprising one or more hardware nodes that each comprise one or more storage devices, e.g., hard disks, optical storage, solid state storage, etc. Cluster storage construct 102 can receive data for storage in a mapped cluster, e.g., data for storage in mapped RAIN cluster storage system 104, etc., hereinafter data 104 for brevity. Data 104 can be stored by portions of the one or more storage devices of cluster storage construct 102 according to a logical mapping of the storage space, e.g., according to one or more mapped clusters.

Cluster storage construct 102 can comprise storage devices of different capacities, e.g., cluster storage construct 102 can be regarded as a heterogeneous. The size of a storage device, e.g., the capacity, can indicate an approximate amount of storage space, e.g., some of the capacity of the storage device can be reserved, unavailable, etc., for actual data storage, for example, where some of the capacity is reserved for disk utilities, etc. Accordingly, an embodiment of cluster storage construct 102 can comprise a first storage device of a first capacity that is a different capacity than a second capacity of a second storage device. In an aspect, the first storage device can be comprised in the same or different real nodes, e.g., first disk component 140 can have a different storage capacity than m-th disk component 148; first disk component 140 can have a different storage capacity than first disk component 150; first disk component 140 can have a different storage capacity than a disk component of L-th cluster storage component 118; etc.

In an aspect, a mapped cluster can be a logical allocation of storage space from cluster storage construct 102. In an embodiment, a portion of a real disk can be comprised in a real node that can be comprised in a real cluster and, furthermore, a portion of the real disk can correspond to a portion of a mapped disk, a mapped disk can comprise one or more portions of one or more real disks, a mapped node can comprise one or more portions of one or more real nodes, a mapped cluster can comprise one or more portions of one or more real clusters, etc. Accordingly, in an embodiment, cluster storage construct 102 can support a mapped cluster enabling data 104 to be stored on one or more disks, e.g., first disk component 140 through M-th disk component 148 of first cluster node component 130 through first disk component 150 through M-th disk component 158 of N-th cluster node component 138 of first cluster storage component (CSC) 110, through disks corresponding to CSCs of L-th cluster storage component 118, according to a mapped cluster schema. In an aspect, a mapped cluster control component, e.g., mapped cluster control component 220-520, etc., can coordinate storage of data 104 on storage elements, e.g., on one or more portions of disk(s), of real cluster(s) of cluster storage construct 102 according to a mapping of a mapped cluster, e.g., mapped cluster control component 220-520, etc., can indicate where in cluster storage construct 102 data 104 is to be stored, cause data 104 to be stored at a location in cluster storage construct 102 based on the mapping of the mapped cluster, etc.

In an embodiment, a mapped cluster employing cluster storage construct 102 can be comprised of one or more portions of one or more real cluster(s), e.g., one or more portion(s) of one or more disk(s) of first CSC 110-L-th CSC 118, etc. Moreover, the mapped cluster can be N' nodes by M' disks in size and the sum of one or more real clusters of cluster storage construct 102 can be N nodes by M disks in size, where N' can be less than, or equal to, N, and M' can be less than, or equal to, or greater than, M. In these other embodiments, the mapped cluster can be smaller than cluster storage construct 102. Moreover, where the mapped cluster is sufficiently small in comparison to cluster storage construct 102, one or more additional mapped clusters can be accommodated by cluster storage construct 102. In an aspect, where mapped cluster(s) are smaller than cluster storage construct 102, the mapped cluster can provide finer granularity of the data storage system. As an example, where cluster storage construct 102 is 8×8, e.g., 8 nodes by 8 disks, then, for example, four mapped 4×4 clusters can be provided, wherein each of the four mapped 4×4 clusters is approximately ¼th the size of cluster storage construct 102. As a second example, given an 8×8 cluster storage construct 102, 16 mapped 2×2 clusters can be provided where each mapped cluster is approximately ¹⁄₁₆th the size of cluster storage construct 102. As a third example, for the example 8×8 cluster storage construct 102, two mapped 4×8 or 8×4 clusters can be provided and each can be approximately ½ the size of cluster storage construct 102. Additionally, the example 8×8 cluster storage construct 102 can provide a mix of different sized mapped clusters, for example one 8×4 mapped cluster, one 4×4 mapped cluster, and four 2×2 mapped clusters. In some embodiments, not all of the storage space of cluster storage construct 102 must be allocated in a mapped cluster, e.g., an example 8×8 cluster storage construct 102 can comprise only one 4×4 mapped cluster with the rest of cluster storage construct 102 being unallocated, differently allocated, etc.

In some embodiments, a mapped cluster can comprise storage space from more than one real cluster, e.g., first CSC 110 through L-th CSC 118 of cluster storage construct 102. In some embodiments, a mapped cluster can comprise storage space from real nodes, e.g., first cluster node component 130, etc., in different geographical areas. In some embodiments, a mapped cluster can comprise storage space from more than one real cluster in more than one geographic location. As an example, a mapped cluster can comprise storage space from a cluster having hardware nodes in a data center in Denver, e.g., where first CSC 110 is embodied in hardware of a Denver data center. In a second example, a mapped cluster can comprise storage space from a first cluster having hardware nodes in a first data center in Denver and from a second cluster also having hardware nodes in the first data center in Denver e.g., where first CSC 110 and L-th CSC 118 are embodied in hardware of a Denver data center. As a further example, a mapped cluster can comprise storage space from both a cluster having hardware nodes in a first data center in Denver and a second data center in Denver e.g., where first CSC 110 is embodied in first hardware of a first Denver data center and where L-th CSC 118 is embodied in second hardware of a second Denver data center. As a further example, a mapped cluster can comprise storage space from a first cluster having hardware nodes in a first data center in Seattle, Wash., and a second data center having hardware nodes in Tacoma, Wash., e.g., where first CSC 110 is embodied in first hardware of a first Seattle data center and where L-th CSC 118 is embodied in second hardware of a second Tacoma data center. As another example, a mapped cluster can comprise storage space from a first cluster having hardware nodes in a first data center in Houston, Tex., and a second cluster having hardware nods in a data center in Mosco, Russia e.g., where first CSC 110 is embodied in first hardware of a first Houston data center and where L-th CSC 118 is embodied in second hardware of a second Mosco data center.

In an aspect, a mapped cluster control component, e.g., 220-520, etc., can allocate storage space of cluster storage component 102 based on an indicated level of granularity. In an aspect, this indicated level of granularity can be determined based on capacities of the storage devices comprising cluster storage construct 102. As an example, in a heterogeneous capacity environment, allocation of mapped nodes according to disk capacity can be different from allocation of whole disks as is illustrated in more detail herein below. In a further aspect, this indicated level of granularity can also be determined based on an amount of data to store, a determined level of storage space efficiency for storing data 104, a customer/subscriber agreement criterion, an amount of storage in cluster storage construct 102, network/computing resource costs, wherein costs can be monetary costs, heat costs, energy costs, maintenance costs, equipment costs, real property/rental/lease cost, or nearly any other costs. In an aspect, these types of information can be termed 'supplemental information', e.g., 222-422, etc., and said supplemental information can be used to allocate mapped storage space in a mapped cluster. In some embodiments, allocation can be unconstrained, e.g., any space of cluster storage component 102 can be allocated into a mapped cluster. In other embodiments, constraints can be applied, e.g., a constraint can be employed by a mapped cluster control component to select or reject the use of some storage space of cluster storage construct 102 when allocating a mapped cluster. As an example, a constraint can restrict allocating two mapped nodes to a same mapped cluster where each mapped nodes uses a disk from the same real node, e.g., because this can result in a data loss event where difficulty accessing the real node can affects two mapped nodes of the same mapped cluster, for example where one of the mapped nodes comprises data and the other mapped nodes comprises recovery data for the data. Other constraints can be readily appreciated, for example, based on a type of data redundancy schema, based on available/use storage space, based on network/computing resource costs, etc., and all such constraints are within the scope of the instant disclosure even where not recited for clarity and brevity.

Figure 2:
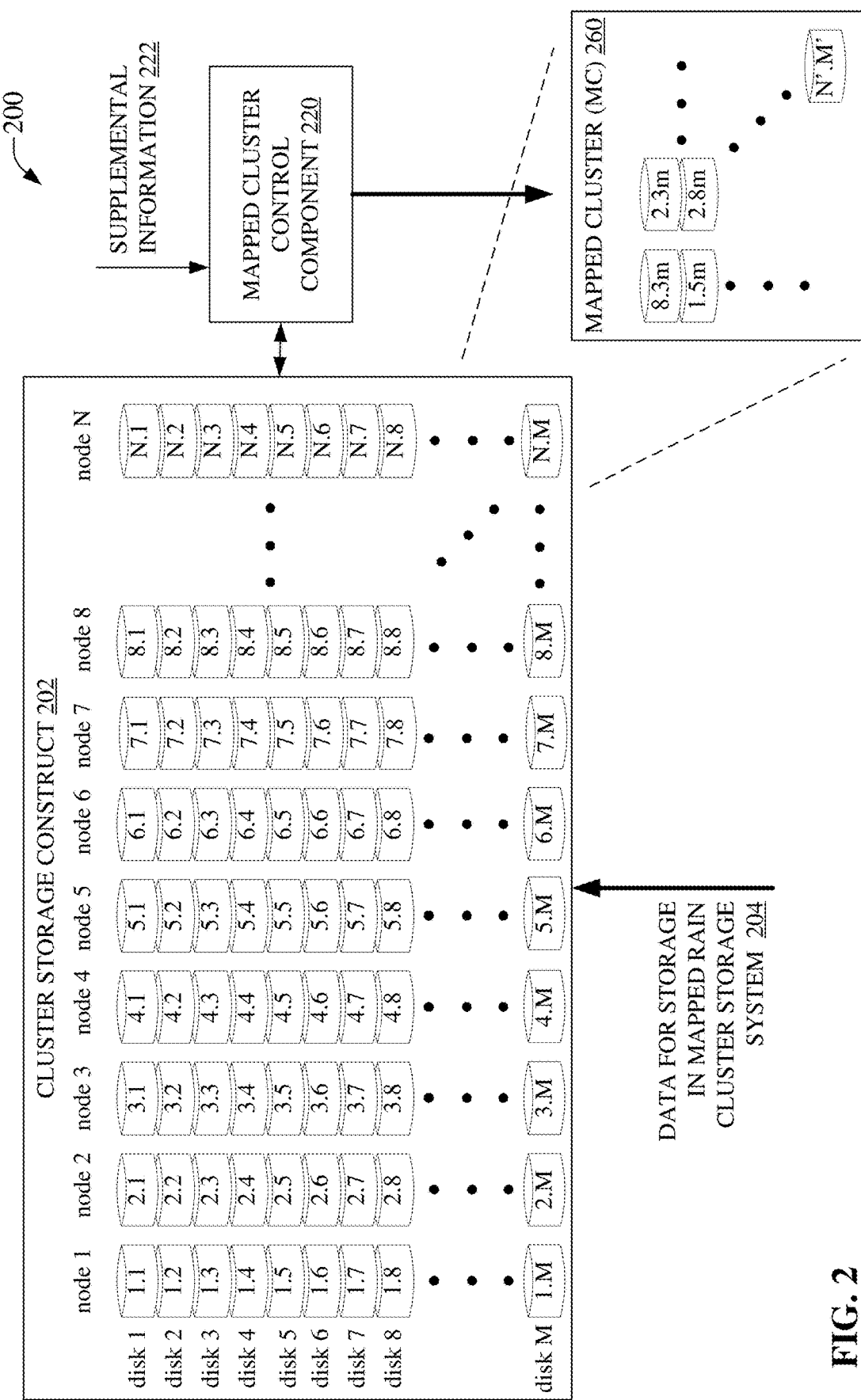
FIG. 2 is an illustration of an example system that can facilitate storage of data via a mapped cluster in a mapped redundant array of independent nodes, in accordance with aspects of the subject disclosure.

FIG. 2 is an illustration of a system 200, which can enable storage of data via a mapped cluster in a mapped redundant array of independent nodes, in accordance with aspects of the subject disclosure. System 200 can comprise cluster storage construct 202 that can be the same as, or similar to, cluster storage construct 102. Cluster storage construct 202 is illustrated at the disk and node level for ease of understating, e.g., disk 1.1 indicating disk 1 of node 1, for example, can be embodied in first disk component 140, disk 2.1, for example, can be embodied in first disk component 150, disk N.M, for example, can be embodied in a disk component of L-th CSC 118, etc. As is illustrated in this example embodiment, cluster storage construct 202 can comprise N nodes of M disks, e.g., disk 1.1 to N.M, etc. Cluster storage construct 202 can be heterogeneous, wherein the disks of the nodes can comprise disks of different storage capacities.

Mapped cluster control component 220 can be communicatively coupled to, or be comprised in, cluster storage construct 202, e.g., mapped cluster control component 220 can execute on a processor comprised in cluster storage construct 202, for example, on at least one processor of one or more of nodes 1-N, on another processor of cluster storage construct 202, on at least one processor of another device, etc. Mapped cluster control component 220 can allocate mapped cluster (MC) 260, which can logically embody storage comprised in cluster storage construct 202. In an embodiment, MC 260 can be allocated based on supplemental information 222. As an example, supplemental information 222 can indicate a first amount of storage is needed and mapped cluster control component 220 can determine a number of, and identity of, disks of cluster storage construct 202 that meet the first amount of storage. In an embodiment this can be identified based, at least in part, on the capacities of the available disks of cluster storage construct 202. Mapped cluster control component 220 can accordingly allocate identified disks as MC 260, e.g., disk 8.3m can correlate to an allocation of disk 8.3, disk 2.3m can correlate to an allocation of disk 2.3, . . . , disk N'.M' can correlate to an allocation of disk N.M, etc.

Mapped cluster control component 220 can facilitate storage of data 204 via MC 260 in the allocated storage areas of cluster storage construct 202. As such, data 204 can be stored in a more granular storage space than would conventionally be available, e.g., in conventional systems all disks of node 1 can be allocated to store data 204 even where the 1 to M disks of available storage space can far exceed an amount of storage needed. As such, according to the presently disclosed subject matter, mapping portions of a disk from a node into MC 260, can result in a lesser amount of storage space being made available for storing the example first amount of storage, e.g., storage space can be allocated more granularly than in conventional technologies. As an example, where a conventional storage cluster can allocate a minimum block of 1.2 petabytes, this can far exceed the example first amount of storage, such as where the first amount of storage can be related to storing a tiny log file, moving data units from legacy systems that employed smaller storage unit sizes, etc., and accordingly, allocating and facilitating storage of data into MC 260, where MC 260 can have minimum block sizes less than the example 1.2 petabytes, can be desirable.

Figure 3:
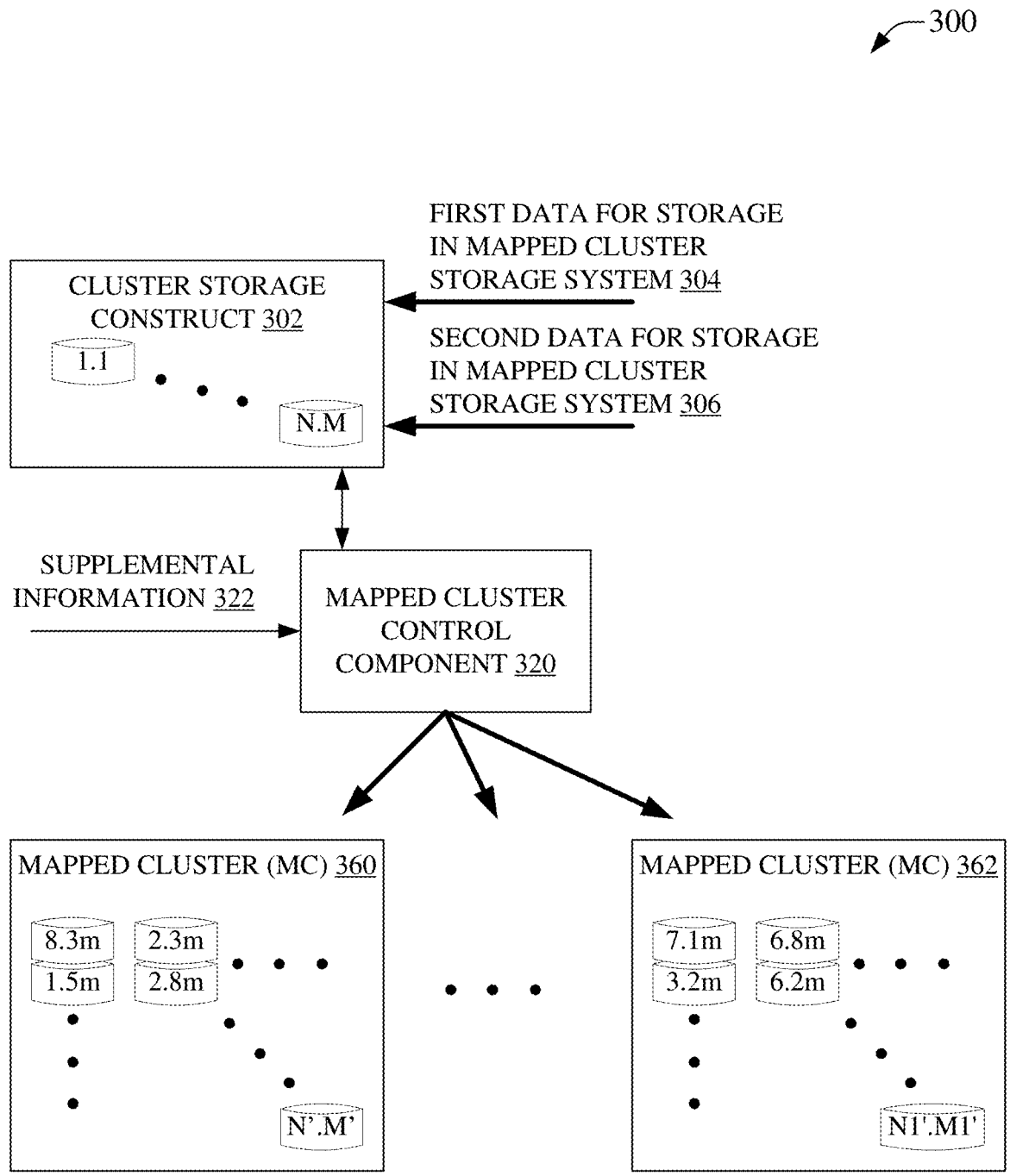
FIG. 3 is an illustration of an example system that can enable storage of data in a plurality of mapped clusters via a mapped redundant array of independent nodes, in accordance with aspects of the subject disclosure.

FIG. 3 is an illustration of a system 300, which can facilitate storage of data in a plurality of mapped clusters via a mapped redundant array of independent nodes, in accordance with aspects of the subject disclosure. System 300 can comprise cluster storage construct 302, which can be heterogeneous and can comprise disk portions 1.1 to N.M in a manner that is the same as, or similar to, cluster storage construct 202. Mapped cluster control component 320 can allocate one or more MC, e.g., MC 360-362, etc. In an embodiment, allocation of MC 360-362 can be based on supplemental information 322 received by mapped cluster control component 320.

Mapped cluster 360 can comprise, for example, disk portion 8.3m, 2.3m, 1.5m, 2.8m, . . . , N'.M' and mapped cluster 362 can comprise, for example, disk portion 7.1m, 6.8m, 3.2m, 6.2m, . . . , N1'.M1'. The example disk portions can map back to corresponding disk portion of cluster storage construct 302, e.g., 8.3m can map to 8.3 of cluster storage construct 302 (not illustrated, but see 8.3 of FIG. 2, etc.), etc. Incoming data for storage, e.g., first data 304 and second data 306, etc., can then be stored according to the mapping of MC 360-362 based on one or more indications from mapped cluster control component 320, e.g., mapped cluster control component 320 can orchestrate or facilitate storage of first data 304, second data 306, etc., into the appropriate disk portion of MC 360-362, etc.

In an embodiment, the size of MC 360 can be the same or different from the size of MC 362. As an example, MC 360 can be allocated based on a first amount of storage, related to storing first data 304, and MC 362 can be allocated based on a second amount of storage, related to storing first data 306. In an aspect the corresponding amounts of storage can be indicated via supplemental information 322, can be based on data 304-306 itself, etc. Moreover, in an embodiment, the size of a MC, e.g., MC 360-362, etc., can be dynamically adapted by mapped cluster control component 320, e.g., as data 304 transitions a threshold level, such as an amount of space occupied in MC 360, an amount of unused space in MC 360, etc., disk portions can be added to, or removed from MC 360 by mapped cluster control component 320. Additionally, adjusting the size of an MC can be based on other occupancy of cluster storage construct 302, e.g., by MC 362, etc., adding disks to cluster storage construct 302, removing disks form cluster storage construct 302, etc. As an example, where MC 362 uses 90% of cluster storage construct 302, the maximum size of MC 360 can be limited to about 10% by mapped cluster control component 320. As another example, where additional disks are added to cluster storage construct 302, for example doubling the storage space thereof, mapped cluster control component 320 can correspondingly increase the size of MC 360. As a further example, where a customer downgrades a storage plan, the lower amount of storage space purchased can be indicated in supplemental information 322 and mapped cluster control component 320 can correspondingly reduce the storage space, e.g., remove disk portions, from MC 360-362, etc.

In some embodiments, mapped cluster control component 320 can allocate disk portions based on other supplemental information 322. As an example, where cluster storage construct 302 comprises high cost storage, again cost can be monetary or other costs, and low cost storage, mapped cluster control component 320 can rank the available storage. This can enable mapped cluster control component 320, for example, to allocate the low cost storage into MC 360-362 first. In another example, the rank can allow mapped cluster control component 320 to allocate higher cost storage, such as where cost corresponds to speed of access, reliability, etc., to accommodate clients that are designated to use the higher ranked storage space, such as a client that pays for premium storage space can have their data stored in an MC that comprises higher ranked storage space.

Figure 4:
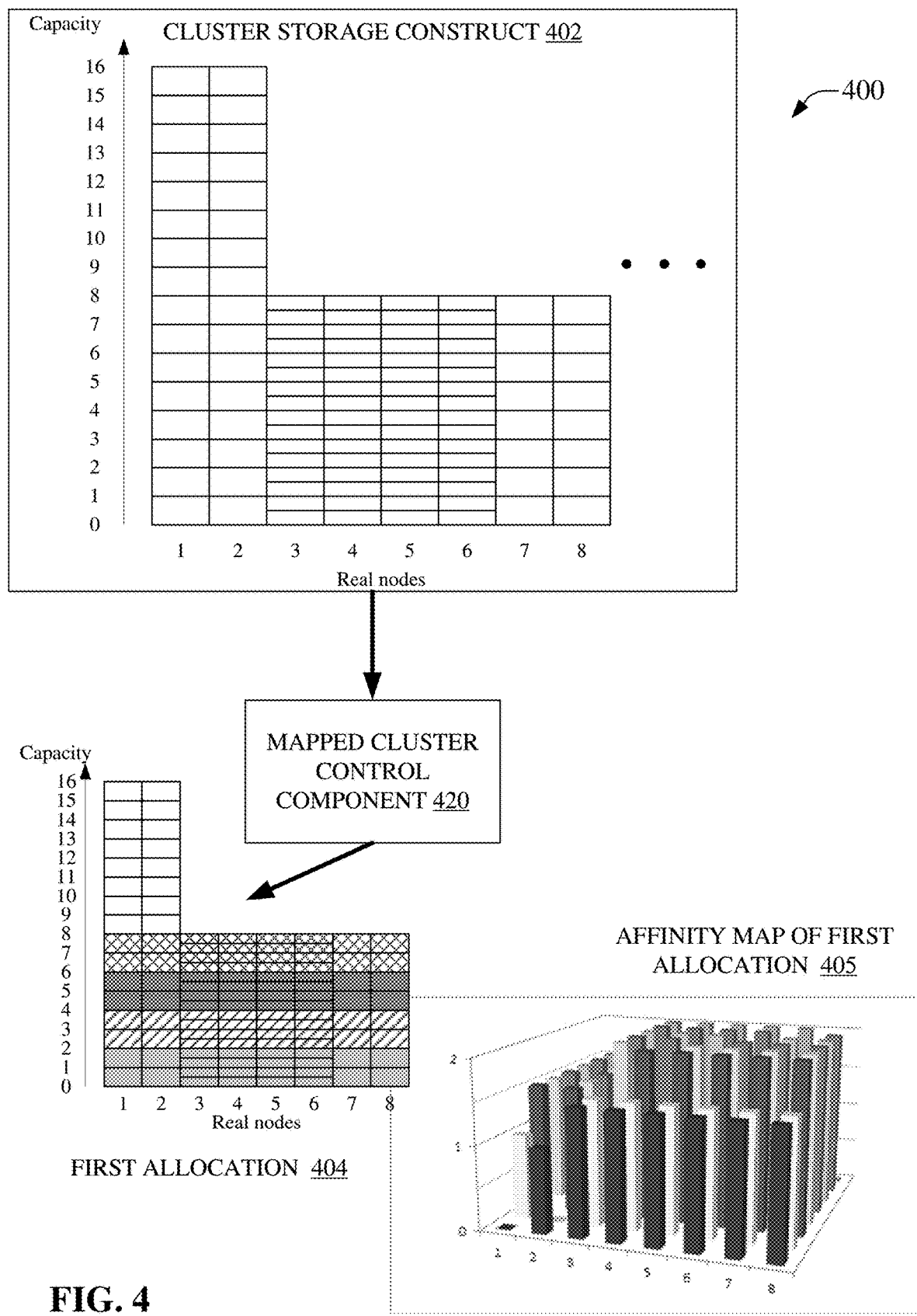
FIG. 4 illustrates an example system that can facilitate storage of data according to a first allocation of mapped redundant arrays of independent nodes, in accordance with aspects of the subject disclosure.

FIG. 4 is an illustration of a system 400, which can enable storage of data according to a first allocation 404 of mapped redundant arrays of independent nodes, in accordance with aspects of the subject disclosure. System 400 can comprise cluster storage construct 402. Cluster storage construct can be the same as, or similar to, cluster storage construct 102-302, etc. In an aspect, cluster storage construct 402 can comprise storage devices having different capacities, e.g., cluster storage construct 402 can be heterogeneous. As examples, real node 1 can comprise 16 disks and have a capacity of 16 units; real node 3 can comprise 16 disks and have a capacity of eight units; real node 7 can comprise eight disks and have a capacity of eight units; etc., for example, as illustrated.

In system 400, there can be a task to assign as many 4×4 mapped clusters as possible to illustrated example cluster storage construct 402. Where real storage devices are assigned without normalization of affinity, this can result in four mapped clusters, e.g., according to first allocation 404. Without normalization of affinity, e.g., according to affinity map of first allocation 405, the broadest distribution of real storage devices to each assigned mapped node results in "bands" of assigned storage devices across the eight real nodes, see for example the shaded bands in illustrated example first allocation 404. This can orphan other available storage devices. As is illustrated, storage devices 8-16 for each of real nodes 1 and 2 can go unallocated because a 4×4 mapped cluster cannot be allocated thereto without violating a rule restricting assigning real storage space on one real node to more than one mapped node of a same mapped cluster.

Affinity map of first allocation 405 illustrates, for example, that the affinity between real nodes 1 and 2 in first allocation 404 is lower than the affinity between, for example, real nodes 4 and 8, etc. This can be interpreted as real nodes 4 and 8 donating a greater percentage of their storage space to shared mapped clusters than the percentage of storage space donated from real nodes 1 and 2. For example, real nodes 4 and 8 donate 100% of their storage devices to four mapped clusters, illustrated as a score of two in first affinity map of first allocation 405 for the column at the intersection of nodes 4 and 8 (mirrored at the intersection of nodes 8 and 4), while real nodes 1 and 2 each donate only 50% of their storage space to the four mapped clusters, illustrated as a score of one in first affinity map of first allocation 405 for the column at the intersection of nodes 1 and 2 (mirrored at the intersection of nodes 2 and 1). Accordingly, in this example, real nodes 4 and 8 have double the affinity of real nodes 1 and 2 because they donate twice the percentage of storage space. As another example, nodes 1 and 8 can be regarded as having a 75% affinity, e.g., node 1 donates 50% of its available storage and node 8 donates 100% of its available storage to the four mapped clusters, see the affinity score of 1.5 in first affinity map of first allocation 405 for the column at the intersection of nodes 1 and 8 (mirrored at the intersection of nodes 8 and 1). It is noted that an intersection of a node with itself, e.g., node 1 and 1, node 2 and 2, etc., is indicated as a null or zero affinity score in first affinity map of first allocation 405.

In system 400, it is demonstrated that some available storage space, e.g., disks 8-16 of each of real nodes 1 and 2, goes unallocated to a mapped cluster where, for example, the task was to allocate a maximum number of 4×4 mapped clusters according to best practices, e.g., without increasing a risk of a real data loss event by allocating real disks of a real node to more than one mapped node of a same mapped cluster. It is noted that the unallocated storage space can be allocated to other mapped clusters with acceptable topologies, e.g., a 2×8 mapped cluster, two 2×4 mapped clusters, etc., can be allocated from real nodes 1 and 2 to consume the capacity of disks 8 to 16 in those nodes, however this still results in allocation of only four 4×4 mapped clusters when the affinity is not normalized, e.g., assigning real disks to mapped clusters at a disk level rather than at a capacity level in a heterogeneous real cluster system. Where allocating storage space is instead based on capacity, rather than just on a count of available disks, e.g., the affinity is normalized, it is possible to assign more 4×4 mapped clusters, see FIG. 5, etc.

Figure 5:
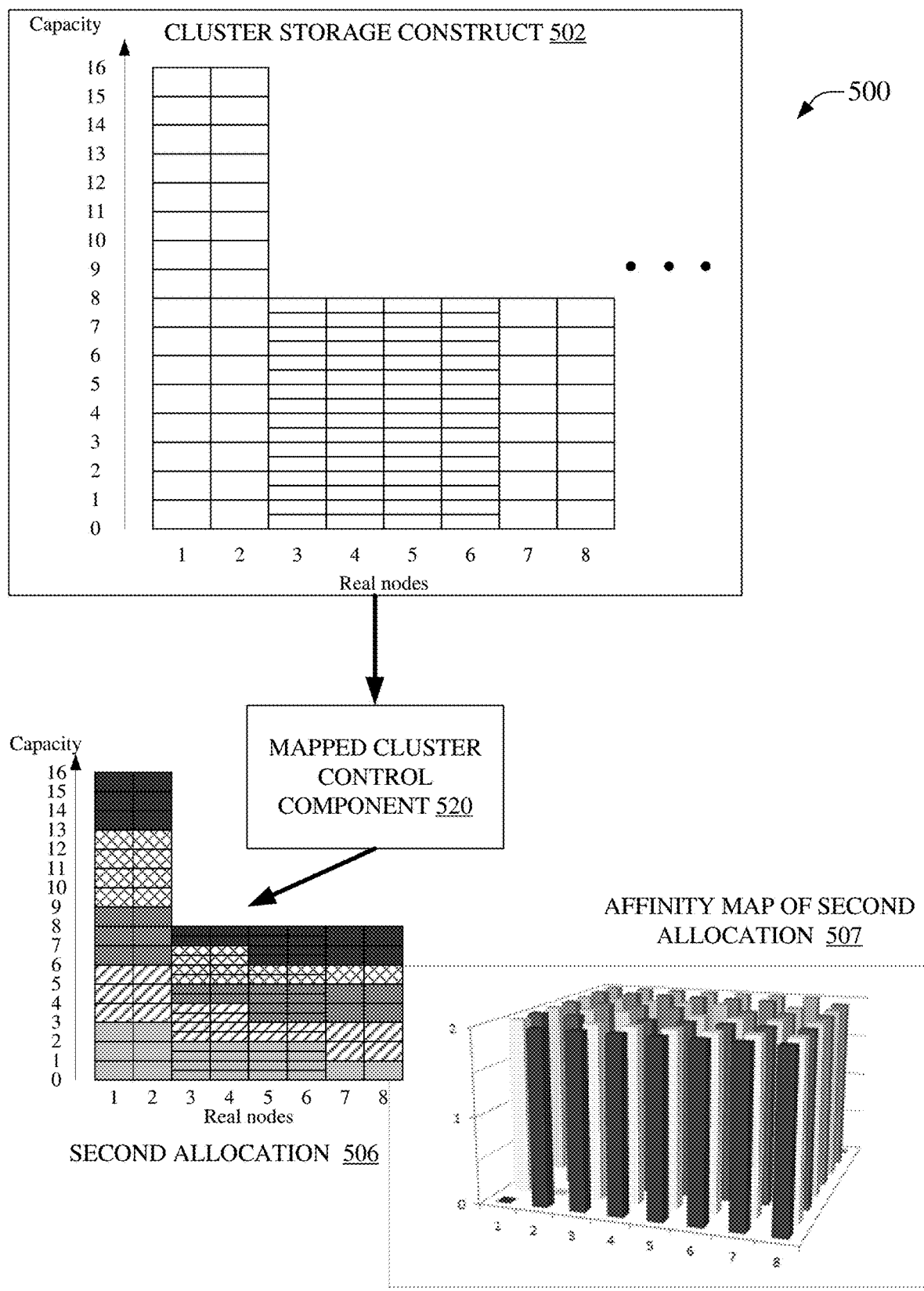
FIG. 5 illustrates an example system that can facilitate storage of data according to a second allocation of mapped redundant arrays of independent nodes, in accordance with aspects of the subject disclosure.

FIG. 5 is an illustration of a system 500, which can facilitate storage of data according to a second allocation of mapped redundant arrays of independent nodes, in accordance with aspects of the subject disclosure. System 500 can comprise cluster storage construct 502. Cluster storage construct can be the same as, or similar to, cluster storage construct 102-302, etc. In an aspect, cluster storage construct 502 can comprise storage devices having different capacities, e.g., cluster storage construct 502 can be heterogeneous. As examples, real node 1 can comprise 16 disks and have a capacity of 16 units; real node 3 can comprise 16 disks and have a capacity of eight units; real node 7 can comprise eight disks and have a capacity of eight units; etc., for example, as illustrated.

In system 500, there, again, can be a task to assign as many 4×4 mapped clusters as possible to illustrated example cluster storage construct 502. Where real storage devices are assigned with normalization of affinity, this can result in five mapped clusters, e.g., according to first allocation 504. By normalizing affinity, e.g., according to affinity map of first allocation 505, the broadest distribution of real storage devices to each assigned mapped node can result in assigning storage devices across more of the available storage space of the eight real nodes than without normalization, see for example the five shaded portions illustrated example first allocation 504. As is illustrated in this example, no storage devices of the eight real nodes go unallocated because 4×4 mapped clusters can be allocated without violating a rule restricting assigning real storage space on one real node to more than one mapped node of a same mapped cluster, for example, by assigning more storage space of a larger capacity real cluster to mapped nodes of a mapped cluster than is allocated from smaller capacity real clusters to the mapped nodes of the mapped cluster. As an example, real node 1 can donate four units of storage capacity to each of the five mapped clusters, real node 3 can donate one unit of storage capacity to each of two of the five mapped clusters and two units of storage capacity to each of the three remaining mapped clusters, real node 7 can donate one unit of storage capacity to one of the five mapped clusters and two units of storage capacity to the remaining four mapped clusters, etc.

Affinity map of first allocation 505 illustrates, for example, that the affinity between the real nodes is more even, e.g., the affinity map appears flat due to normalization and each of the real node pairs have an affinity of 2. This can be interpreted as each of the real nodes donating an equal percentage of their storage space to shared mapped clusters, e.g., real node 1 donates 100% of its storage space to the five mapped clusters, real node 3 donates 100% of its storage space to the five mapped clusters, real node 7 donates 100% of its storage space to the five mapped clusters, etc. It is again noted that an intersection of a node with itself, e.g., node 1 and 1, node 2 and 2, etc., is indicated as a null or zero affinity score in first affinity map of first allocation 505.

Normalized affinity between two real nodes can be defined as a sum of capacity shares the two real nodes donate to the same mapped node, e.g., the same mapped RAIN. As an example, real node 1 can manages 16 real disks, real node 2 can manage eight real disks, a mapped cluster can use four disks of real node 1 and four disks of real node 2, thus normalized affinity between the nodes created by the mapped cluster can be equal to 4/16+4/8=¾. The resource allocation algorithm can be designed to distribute a normalized affinity evenly across real node pairs. Use of normalized affinity therefore can be employed to cause an algorithm to allocate more disks from real nodes that have more storage capacity. In an aspect, such an algorithm can employ, for example, a "normalized affinity matrix" to keep information about the quality of a mutual disposition of mapped clusters. An example normalized affinity matrix can be a square matrix N×N, where N is a number of real nodes in a real cluster, for example eight real nodes in cluster storage construct 502. A value $X(i,j)$ in a matrix can indicate a normalized affinity between i-th and j-th real nodes. Again, it is noted that (a) $X(i,i)=0$ and (b) $X(i,j)=X(j,i)$. Accordingly, a mutual disposition of mapped nodes and mapped clusters where all values $X(i,j|i!)=j$ are the same or similar can be preferable, e.g., appears flatter than affinity map of first allocation 405.

An example algorithm for disk allocation/mapping can be as follows. It is noted that a given mapped cluster can be described as being of size N'×M' and where M' can be a nominal disk size. It is further noted that, for each disk required for a mapped cluster, the example algorithm can allocate a first disk of size>=the nominal disk size; a group of disks with total capacity>=the nominal disk size, etc. First, real disks can be allocated for the mapped clusters serving the mapped clusters iteratively where, when starting with a next mapped cluster, a first real disk from a real node that has the greatest share of free (not allocated) capacity among all real nodes can be allocated and for, each mapped cluster, real disks can be allocated for the mapped disks serving the mapped disks iteratively, e.g., from left to right and top to bottom, etc. In shorthand, real disks can be allocated for the first disks of the mapped nodes before allocation of second disks, etc. Moreover, if the size of the allocated real disk is to be less than the disk size requested for the mapped cluster, more disks from the same real node can be allocated until the total size of the real disks is greater or equal to the size of the disk requested for the mapped cluster. Further, before moving to the next mapped cluster allocation, indicate a set of indices of real nodes, e.g., i-th real node, etc., which are already involved, e.g., have already donated at least one disk, in the mapped cluster being allocated and, when allocating another real disk for the instant mapped cluster, find a real node j, which (a) has enough free disks for to accommodate another mapped disk, (b) can donate a disk(s) without violating a rule, e.g., to avoid mapping two mapped nodes of one mapped cluster from the same real node, and (c) node j has the lowest value $X(i,j)$, where i !=j and i belongs to i's. It is noted that j may also belong to i's. This enables a disk from the node j to be used in the instant mapped cluster. Accordingly, a normalized affinity matrix can be updated. Where the i-real nodes contain multiple indices, the corresponding affinity values can be updated to keep the normalized affinity matrix current during the assignment algorithm. Where the instant mapped cluster has been assigned storage devices from the real nodes by iterating through the previous portion of the example algorithm, the algorithm can advance to allocation for a next mapped cluster. In an aspect, resource allocation can be deemed successful when enough real disks have been allocated for each mapped cluster instance and can be deemed to have failed when the algorithm cannot determine a real node j for a mapped cluster being allocated, e.g., before moving to a next mapped cluster allocation.

Heterogeneity of hardware can make efficient resource allocation a non-trivial task. The disclosed subject matter can facilitate more efficient allocation of Mapped RAINs in a heterogeneous cluster storage construct. Where assignment or allocation of a real storage device(s) to support a mapped node occurs in a manner that is considerate of the capacity of a real node, rather than merely assigning at a disk level, a greater amount of allocated storage capacity can be taken from real nodes that are more capacious. This can result in a broad distribution of storage involving more real nodes resulting in efficient use of storage space to support mapped clusters. It is noted that, in a homogeneous cluster storage construct, e.g., where all disks are of the same, or similar capacity, assignment at a disk-level emulates normalized affinity. In an aspect, use of normalized affinity in a homogeneous cluster can still result in efficient allocation of storage space to a maximum number of mapped RAINs.

Figure 6:
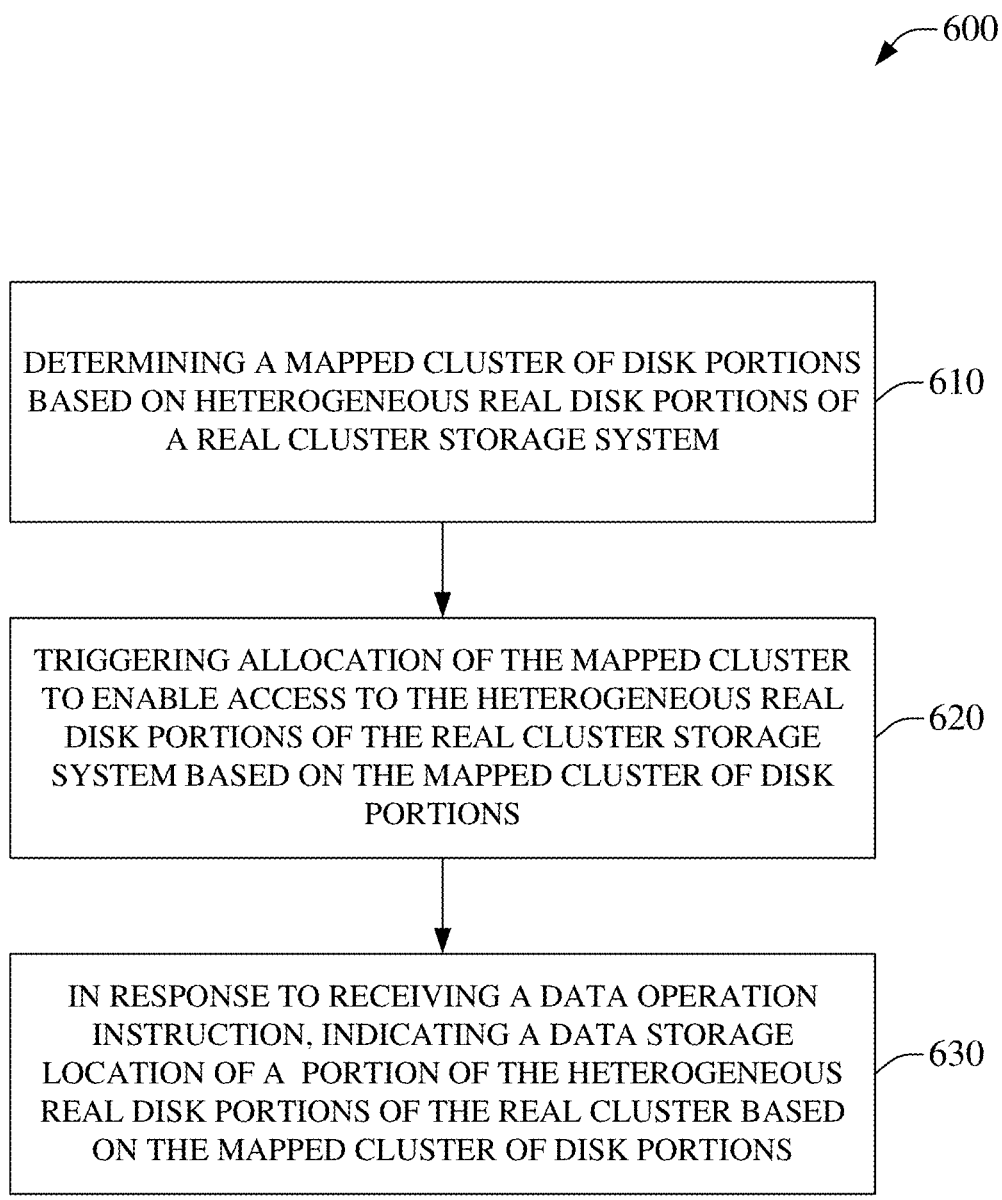
FIG. 6 is an illustration of an example method facilitating storage of data in a mapped redundant array of independent nodes, in accordance with aspects of the subject disclosure.
Figure 7:
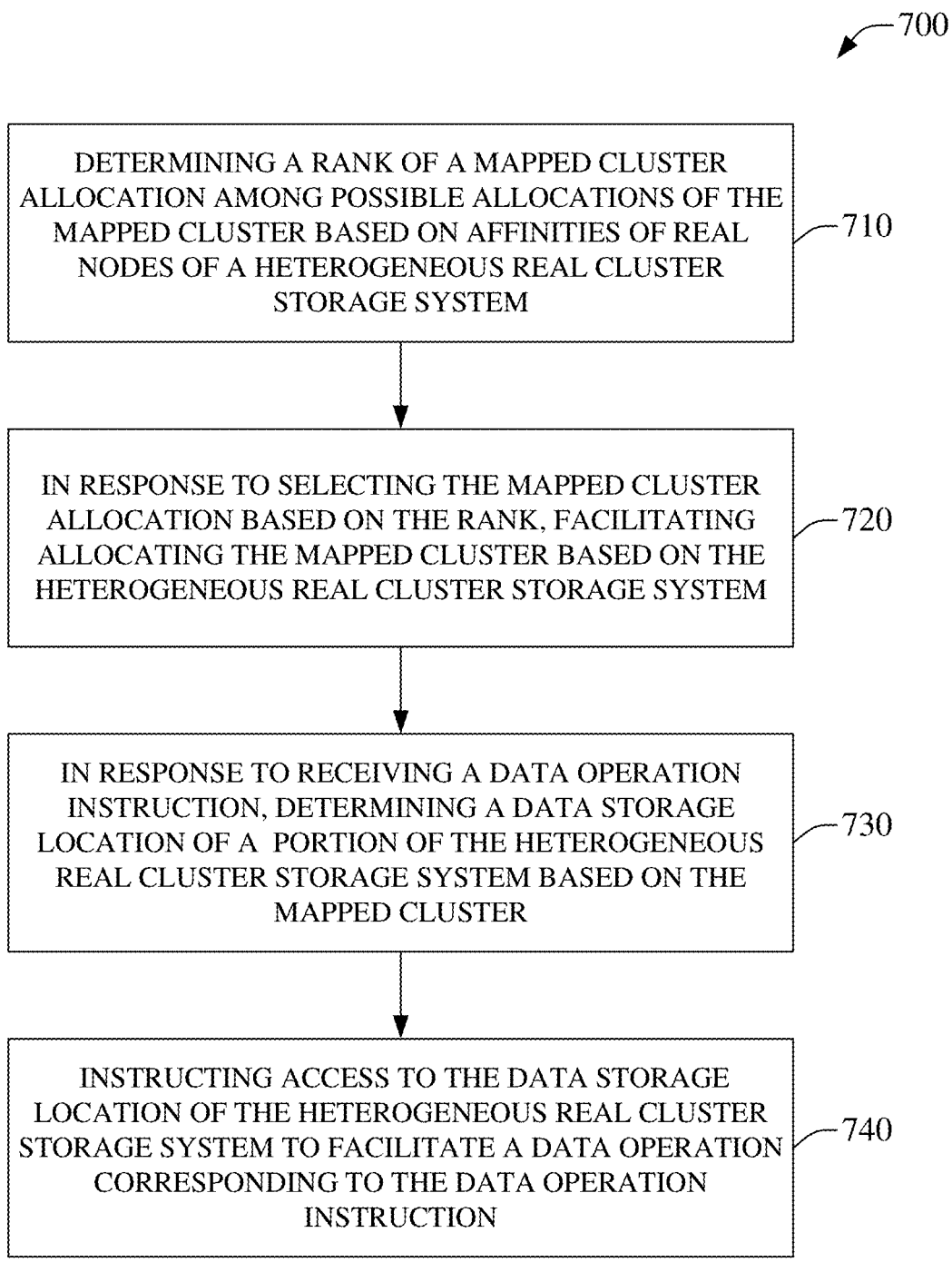
FIG. 7 is an illustration of an example method enabling storage of data in a mapped redundant array of independent nodes employing storage hardware that can comprise storage devices of different capacities, in accordance with aspects of the subject disclosure.
Figure 8:
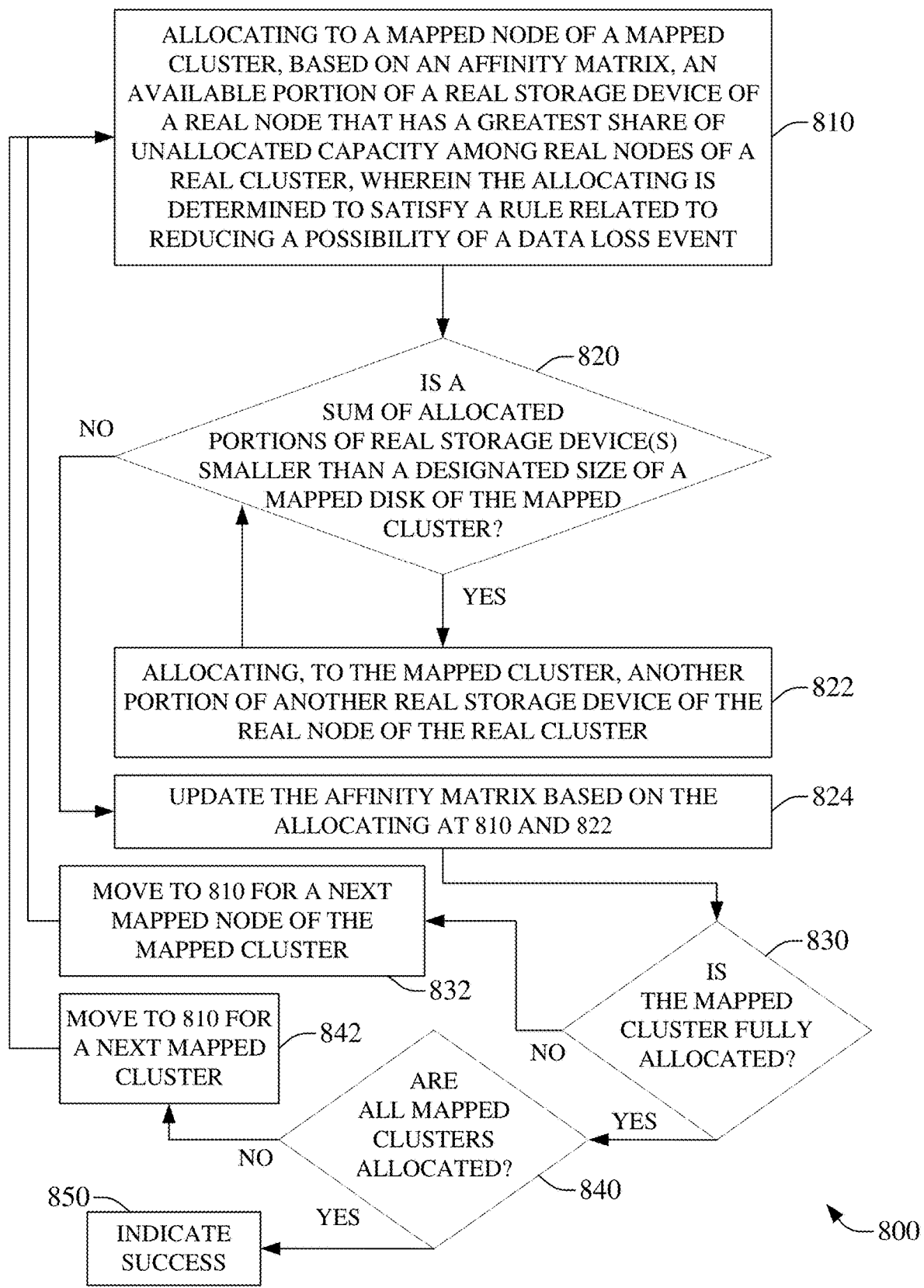
FIG. 8 illustrates an example method facilitating heterogeneous storage of data in mapped redundant arrays of independent nodes employing based on a normalized affinity matrix, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 is an illustration of an example method 600, which can enable storage of data in a mapped redundant array of independent nodes, in accordance with aspects of the subject disclosure. At 610, method 600 can comprise determining a mapped cluster of disk portions. The determining can be based on heterogeneous real disk portions of a real cluster storage system, e.g., a real cluster storage system comprising storage devices of different capacities. The mapped cluster of disk portions can therefore comprise different size real storage devices, e.g., storage devices of the same or different capacities. As an example, a real cluster can comprise a first storage device of a first capacity and a second storage devices of a second capacity different from the first capacity, e.g., the first capacity can be one unit of storage and the second capacity can be two units of storage; the first capacity can be one unit of storage and the second capacity can be half a unit of storage; etc. As another example, a first real node can comprise disks of 10 TB and a second real node can comprise disks of 20 TB, such that the mapped cluster can comprise disks of 10 TB, disks of 20 TB, disks of both 10 TB and 20 TB, etc.

A mapped RAIN can have a higher level of availability for data stored on the mapped RAIN when the data is stored in a more dispersed manner across the real storage devises corresponding to the mapped RAIN, e.g., storing data across more storage devices of a real RAIN generally corresponds to the data remaining more available. As an example, where portions of the real RAIN become less accessible, more of the data remains available because more of that data is stored on other portions of the real RAIN that are not less accessible. A mapped RAIN can be allocated such that the mapped nodes are preferably comprised of storage devices from more, rather than fewer, real nodes of a real RAIN, e.g., the mapped disks can be distributed across as many real nodes as is feasible.

Data availability at a system level can also be stored in a manner allowing for recovery of data, e.g., data can be stored in a protection set comprising data and recovery data. Recovery data can enable recovery of data that is compromised, e.g., a protection set can comprise data and a copy of the data, redundant data, duplicate data, erasure coding data, etc., to enable data recovery without departing from the scope of the disclosed subject matter. Typically, a protection set can be stored such that recovery of less accessible data can be successful, e.g., in the example where recovery data is a copy of data, then typically the recovery data would not be stored on the same storage device as the data because failure of the storage device would then compromise both the data and the corresponding recovery data, rather, the recovery data can be stored appropriately to allow recovery of the data, e.g., the recovery data can be stored on a different storage device, different node, different cluster, different geographical location, etc. From the system perspective, a failure of a real node comprising data stored via a mapped node can be recovered from by performing data recovery from other real nodes comprising recovery data.

In an aspect, a mapped RAIN can have an "affinity" with real nodes having storage devices participating in the mapped RAIN. Accordingly, from the system level, a best practice can be to have greater affinities, e.g., it can be desirable for data to be stored across more real nodes. In an aspect, affinity can be determined between real nodes, real disks, etc., e.g., an affinity between two real nodes occurs when they both participate in supporting a same mapped RAIN. Thus, where a real node fails, e.g., becomes less accessible, a greater number of other real nodes can participate in recovery of the corresponding less accessible data. Where more real nodes participate in the recovery of the less accessible data, typically more processors, etc., can be tasked with recovery of portions of the less accessible data and, moreover, each of the participating real nodes can need to recover a smaller portion of the less accessible data. This, in turn, can result in a shorter duration of recovery, a faster recovery, etc. Where recovery is faster, a probability of multiple simultaneous failures can be reduced.

In an aspect, high affinities can be associated with widely distributing storage across real nodes, real devices, etc. In the disclosed subject matter, it is observed that, in a heterogeneous storage device environment, e.g., where storage devices of a real cluster can be of different capacities, an affinity between two real nodes can be measured in capacity units. The affinity between two real nodes can then be defined as amount of capacity the two real nodes donate to one or more same mapped RAINs. The concept of affinity between nodes can be especially valuable for large real clusters that run sets of small and medium-sized mapped clusters because such systems to have some of the real nodes serving different groups of mapped clusters. In an aspect, an even distribution of affinity for real clusters can be desirable where the real nodes manage the same amount of storage capacity, including when the real clusters comprise heterogeneous storage device capacities, e.g., the disks of the real cluster can be of different sizes. In an aspect, where real nodes manage different amounts of storage capacity, even distribution of affinity may give unsatisfactory results from a resource utilization point of view.

Method 600, at 620, can comprise triggering allocation of the mapped cluster to enable access to the heterogeneous real disk portions of the real cluster storage system based on the mapped cluster of disk portions. Access can be based on the mapped cluster disk portions. In an aspect, the mapping of the mapped cluster disk portions to the real cluster real disk portions can enable accessing a real data storage location, e.g., to read, write, erase, alter, etc., data corresponding to the real data storage location based on a corresponding mapped disk portion.

At 630, method 600 can comprise indicating a data storage location. This can be in response to receiving a data operation instruction. The data storage location can be in a portion of eh heterogeneous real disk portions of the real cluster based on the mapped cluster of disk portions. At this point method 600 can end. At 630, the method can therefore access data stored in different sized storage devices according to best practices.

In an aspect, a mapped cluster can be allocated based on an indicated level of granularity. In an aspect, this indicated level of granularity can be determined based on an amount of data to store, a determined level of storage space efficiency for storing data, a customer/subscriber agreement criterion, an amount of storage in cluster storage system, network/computing resource costs, wherein costs can be monetary or other costs, etc., e.g., supplemental information 222-322, etc. The supplemental information can be used in the allocating mapped storage space for the mapped cluster. In some embodiments, allocation can be unconstrained, while in other embodiments, constraints can be applied when allocating a mapped cluster, e.g., a constraint against two mapped nodes of a mapped cluster each using a disk from the same real node due to a potential data event that can occur from difficulty accessing the real node. Other constraints can be readily appreciated, for example, based on a type of data redundancy schema, based on available/use storage space, based on network/computing resource costs, etc., and all such constraints are within the scope of the instant disclosure even where not recited for clarity and brevity.

FIG. 7 is an illustration of an example method 700, which can facilitate storage of data in a mapped redundant array of independent nodes employing storage hardware that can comprise storage devices of different capacities, in accordance with aspects of the subject disclosure. At 710, method 700 can comprise determining a rank of a mapped cluster allocation among possible allocation of the mapped cluster. The possible allocations can be based on affinities of real disks of a heterogeneous mapped cluster storage system. Where a possible allocation of the mapped cluster can be associated with higher overall affinities, it can be preferable to an allocation associated with lower overall affinities. As an example, a 'flatter' affinity map for a possible mapped cluster allocation can be preferable to a less flat affinity map for another possible mapped cluster allocation, whereby the allocation associated with the flatter affinity map can be selected over the less flat affinity map. As another example, two similarly flat affinity maps, one with higher overall affinities than the other, can lead to selection of the mapped cluster allocation associated with the higher flat affinities.

At 720, method 700 can comprise facilitating allocation of a mapped cluster that can be selected based on the rank of the mapped cluster allocation. The allocation can be based on the heterogeneous real cluster storage system. In an aspect, the selection of the mapped cluster based on the rank of the mapped cluster allocation against other possible mapped cluster allocations can enable allocation of a mapped cluster that has better affinities than the other ranked possible mapped cluster allocations. This can provide for allocation of a mapped cluster that stores data across a larger number of real disks and therefore can provide improved data access and protection in comparison to conventional technologies.

Method 700, at 730, can comprise determining a data storage location in response to receiving a data operation instruction. The data storage location can be comprised in a portion of the heterogeneous real cluster storage system and be based on the mapped cluster.

At 740, method 700 can comprise instructing access to the data storage location of the heterogeneous real cluster storage system. At this point method 700 can end. The access instruction can facilitate performing a data operation corresponding to the data operation instruction.

FIG. 8 is an illustration of an example method 800, facilitating heterogeneous storage of data in mapped redundant arrays of independent nodes employing based on a normalized affinity matrix, in accordance with aspects of the subject disclosure. Method 800, at 810 can comprise allocating an available portion of a real storage device of a real node of a real cluster to a mapped node of a mapped cluster. The allocating can allocate the available portion of the real storage device that has a greatest share of unallocated capacity from among real nodes of the real cluster and can be based on an affinity matrix. The allocation can be determined to satisfy a rule related to reducing possibility of a data loss event, e.g., the allocation can avoid allocating portions of two disks of a real node to two mapped nodes of a given mapped cluster as discussed hereinabove.

At 820, method 800 can comprise determining if a sum of allocated portions of real storage device(s) is smaller than a designated size of a mapped disk of the mapped cluster. In an aspect, the determining can facilitate allocating sufficient real disk space for a given mapped disk of a mapped node of the mapped cluster, e.g., if the mapped cluster is designates as having 100 TB mapped disks, then the allocated portion of the real cluster at 810 should be at least 100 TB and, if not, then the sum of the allocations between 810 and 830 should be at least 100 TB.

At 822, method 800 can comprise allocating another portion of another real storage device of the real node of the real cluster where the sum of allocated portions at 820 is determined to be less than the designated size of the mapped disk. As an example, if the allocating at 810 allocates 50 TB of disk space to a mapped disk designated to use a 70 TB disk, then at 822, further allocations can be used to increase the sum of the allocations to be equal to, or greater than, 70 TB, e.g., another 25 TB can be allocated in one iteration of 822, another 20 TB can be allocated in one iteration of 822, two iterations of 822 can allocate 5 TB and 15 TB, etc. Where the iterations of 822 raise the sum of the allocations above the designated size of the mapped disk, method 800 can proceed from 820 to 824, where the affinity matrix can be updated to reflect the allocation(s) of real disk space to the mapped cluster.

At 830, method 800 can determine if the mapped cluster is fully allocated. In an aspect, allocation of storage space at 820-824 can result in allocation for a mapped disk of the mapped cluster, at 830, additional mapped disks of the same mapped cluster can be allocated by method 800 moving to 832 where the mapped node can be incremented. Incrimination of the mapped node can comprise incrementing to a next mapped disk of the same mapped node, or where applicable, incrementing to a next mapped disk of a next mapped node of the mapped cluster. At 830, method 800 can be viewed as moving the algorithm to allocating a next mapped disk and/or mapped node until all of the mapped disks of the mapped cluster are fully allocated. Where the mapped cluster is fully allocated by 810-832, method 800 can move to 840.

Method 800, at 840, can comprise determining that all mapped clusters to be allocated are allocated. As an example, where only one mapped cluster is to be allocated, then method 800 can move to 850 and end where 830 is determined to be a 'yes,' because this will coincide with 840 being a 'yes.' As another example, where two mapped clusters are to be allocated, then method 800, at 840 after fully allocating one mapped cluster, can begin another iteration to allocate the second mapped cluster, e.g., 840 can be answered 'no' and can move to 842 to increment to a next mapped cluster, after which iteration of 810-840, method 800 can move to 850 and end. In an aspect, where method 800 can not progress to 850, the method can end but would indicate a failure to fully allocate all mapped clusters. It is noted that the allocations are based on an affinity matrix, see 810, and as such, allocation of available storage space can enable broad allocation across real nodes to improve data access and data recovery as disclosed elsewhere herein.

Figure 9:
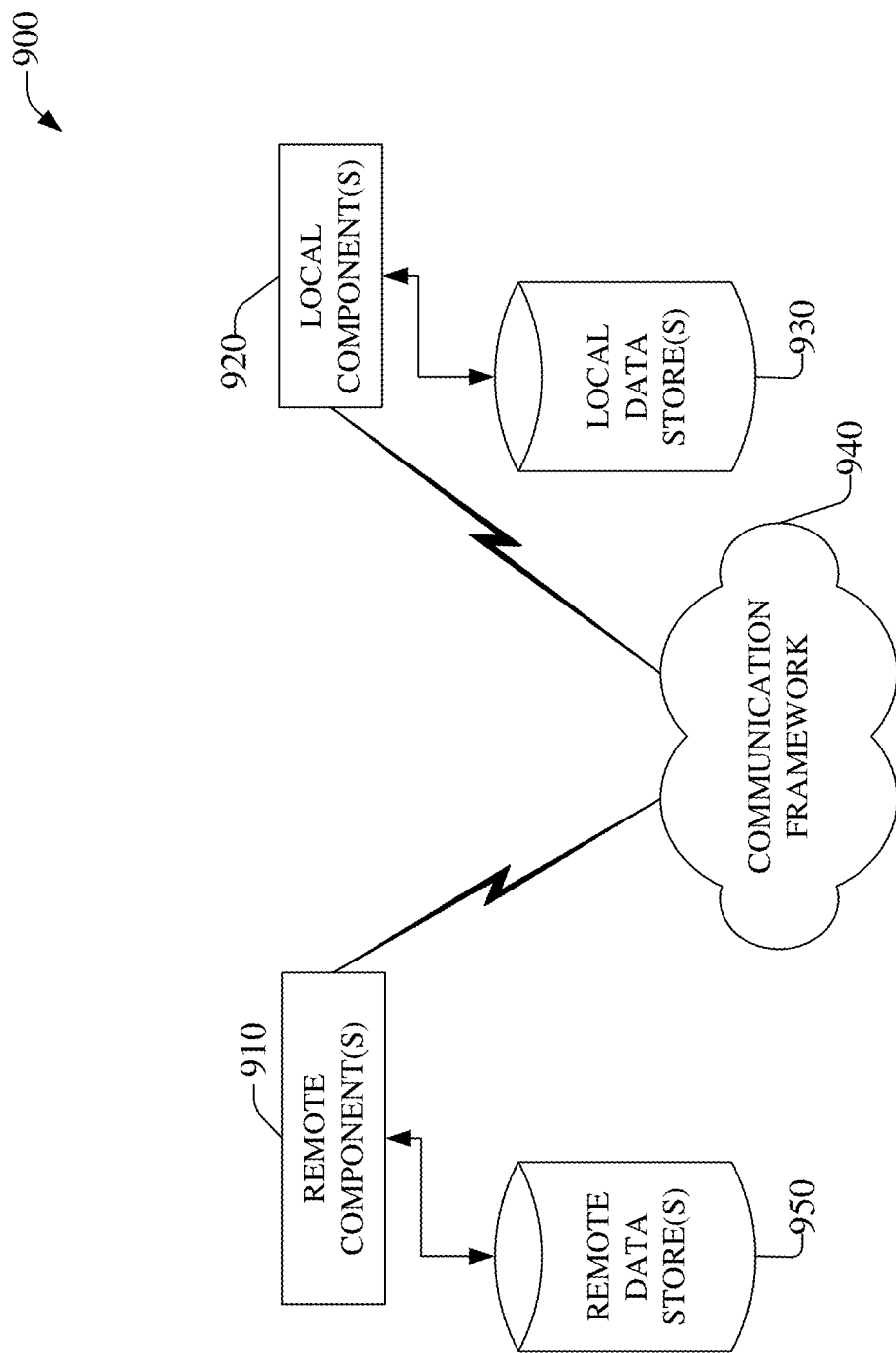
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a remotely located cluster storage device, e.g., embodied in a cluster storage construct, such as 102-502, etc., a mapped cluster control component 220-520, etc., connected to other components via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise a local cluster storage device, e.g., embodied in a cluster storage construct, such as 102-502, etc., a mapped cluster control component 220-520, etc., connected to other components via communication framework 940.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As an example, information corresponding to a mapped data storage location can be communicated via communication framework 940 to other devices, e.g., to facilitate access to a real data storage location, as disclosed herein.

Figure 10:
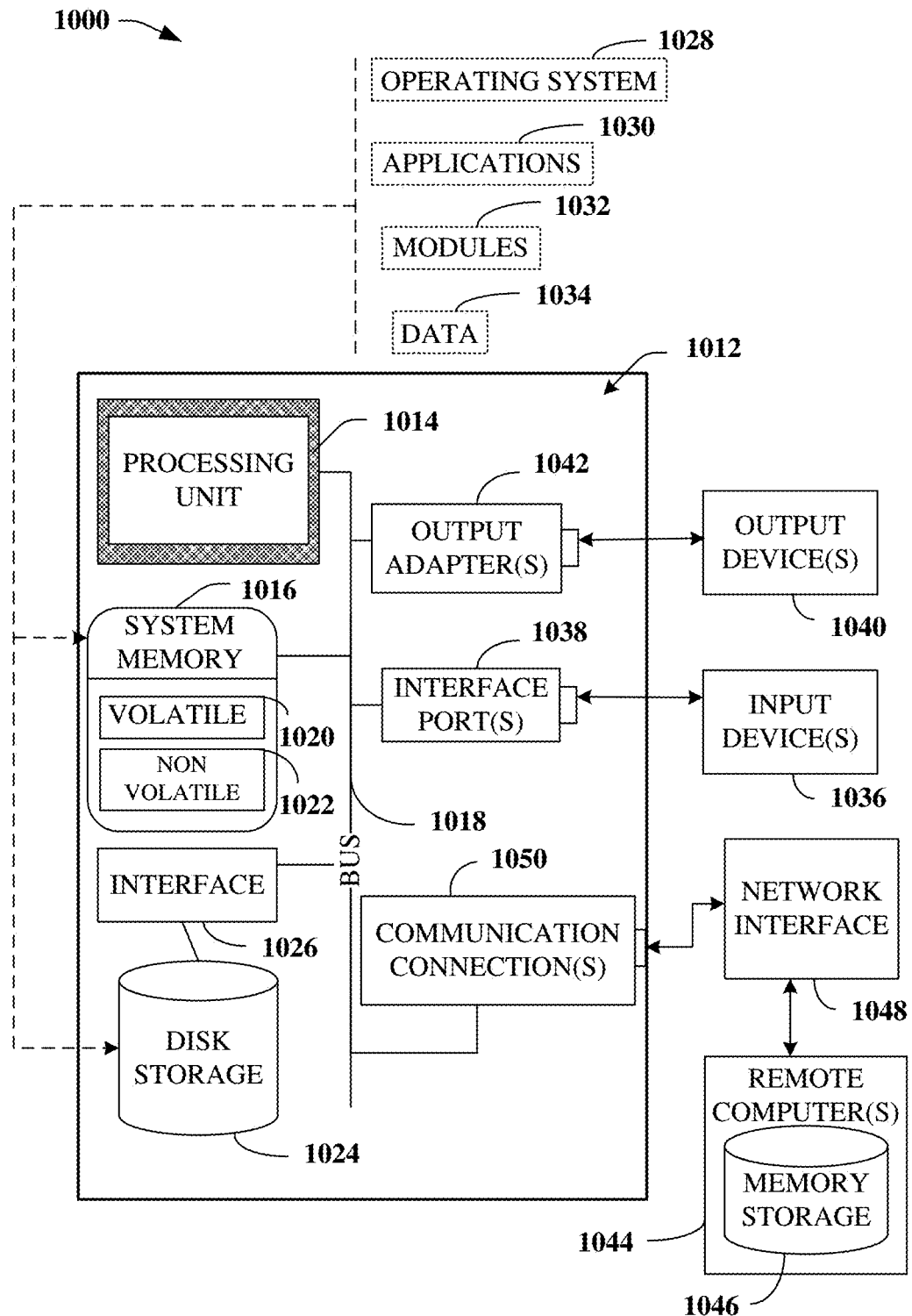
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in a cluster storage construct, such as 102-502, etc., a mapped cluster control component 220-520, etc., or other components, can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining a first mapped cluster scheme based on an affinity score, wherein the real cluster storage system comprises a first storage device of a first capacity that is a different capacity than a second capacity of a second storage device of the real cluster storage system, allocating the first storage space as a first mapped cluster based on a criterion of the real cluster storage system, and providing information enabling a data operation to occur based on the first mapped cluster scheme, as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
determining a first mapped cluster scheme based on a real cluster storage system criterion for a real cluster storage system, wherein the first mapped cluster scheme is in accord with a data loss prevention rule, wherein the data loss prevention rule prohibits a mapping scheme from resulting in a mapped cluster storing first data via a first storage device of a first real node and further storing second data that is redundant to the first data via a second storage device of the first real node, wherein the real cluster storage system comprises the first storage device and the second storage device, and wherein the first storage device and the second storage device have different storage capacities;
allocating first storage space of the real cluster storage system as a first mapped cluster based on the first mapped cluster scheme;
allocating second storage space of the real cluster storage system as a second mapped cluster based on a second mapped cluster scheme, wherein the second mapped cluster scheme is in accord with the data loss prevention rule, and wherein the first mapped cluster and the second mapped cluster exist contemporaneously; and
facilitating a data operation corresponding to a data storage location comprised in the real cluster storage system according to the first mapped cluster based on the first mapped cluster scheme.

2. The system of claim 1, wherein the real cluster storage system comprises 1 to L real data storage clusters.

3. The system of claim 2, wherein a real data storage cluster of the 1 to L real data storage clusters comprises 1 to N hardware data storage nodes, wherein a hardware data storage node of the 1 to N hardware storage nodes comprises 1 to M data storage devices, and wherein the data storage location is comprised in a data storage device of the 1 to M data storage devices of the hardware data storage node of the 1 to N hardware data storage devices of the real data storage cluster of the 1 to L data storage clusters.

4. The system of claim 3, wherein the first storage device is comprised in the 1 to M data storage devices of the hardware data storage node of the 1 to N hardware data storage devices of the real data storage cluster of the 1 to L data storage clusters.

5. The system of claim 3, wherein the second storage device is comprised in the 1 to M data storage devices of the hardware data storage node of the 1 to N hardware data storage devices of the real data storage cluster of the 1 to L data storage clusters.

6. The system of claim 3, wherein the second storage device is comprised in the 1 to M data storage devices of another hardware data storage node of the 1 to N hardware data storage devices of the real data storage cluster of the 1 to L data storage clusters.

7. The system of claim 3, wherein the second storage device is comprised in the 1 to M data storage devices of the hardware data storage node of the 1 to N hardware data storage devices of another real data storage cluster of the 1 to L data storage clusters.

8. The system of claim 1, wherein the allocating the first storage space of the real cluster is based on an overall amount of storage of the real cluster storage system.

9. The system of claim 1, wherein the allocating the first storage space of the real cluster is based on an affinity matrix corresponding to the real cluster storage system.

10. The system of claim 1, wherein the operations further comprise, ranking affinities of possible mapped cluster schema comprising the first mapped cluster scheme based on a uniformity of the affinities for each possible mapped cluster scheme of the possible mapped cluster schema.

11. The system of claim 1, wherein the operations further comprise, ranking affinities of possible mapped cluster schema comprising the first mapped cluster scheme based on affinity magnitudes within each possible mapped cluster scheme of the possible mapped cluster schema.

12. A method, comprising:
allocating, by a system comprising a processor and a memory, first storage space of a real cluster storage system as a first mapped cluster according to a determined first mapped cluster scheme based on a real cluster storage system criterion, wherein the first mapped cluster scheme is in accord with a data loss prevention rule, wherein the data loss prevention rule prohibits a mapping scheme from resulting in a mapped cluster storing first data via a first storage device of a first real node and further storing second data that is redundant to the first data via a second storage device of the first real node, wherein the real cluster storage system comprises the first storage device of a first capacity and the second storage device of a second capacity, and wherein the first capacity and the second capacity are different capacities;
allocating, by the system, second storage space of the real cluster storage system as a second mapped cluster according to a second mapped cluster scheme, wherein the second mapped cluster scheme is in accord with the data loss prevention rule, and wherein the first mapped cluster and the second mapped cluster are supported by the system contemporaneously; and
causing, by the system, a data operation to occur in the first storage space of the real cluster storage system according to the first mapped cluster and based on the first mapped cluster schema.

13. The method of claim 12, wherein the allocating the first storage space comprises allocating the first storage device that is comprised in a first hardware data storage node of the real cluster storage system.

14. The method of claim 13, wherein the allocating the first storage space comprises allocating the second storage device that is comprised in the first hardware data storage node of the real cluster storage system.

15. The method of claim 13, wherein the allocating the first storage space comprises allocating the second storage device that is comprised in a second hardware data storage node of the real cluster storage system, and wherein the second hardware data storage node is a different hardware data storage node than the first hardware data storage node.

16. The method of claim 12, wherein the allocating the first storage space is based on an affinity matrix corresponding to the real cluster storage system.

17. A non-transitory computer-readable medium, comprising executable instructions that, when executed by a processor, facilitate performance of operations, comprising:
determining a first mapped cluster scheme based on a first request for first storage space in a real cluster storage system and based on an affinity score for two real nodes of the real cluster storage system, wherein the first mapped cluster scheme is in accord with a data loss prevention rule, wherein the data loss prevention rule prohibits a mapping scheme from resulting in a mapped cluster storing first data via a first storage device of a first real node and further storing second data that is redundant to the first data via a second storage device of the first real node, wherein the real cluster storage system comprises the first storage device of a first capacity that is a different capacity than a second capacity of the second storage device of the real cluster storage system;

allocating the first storage space of the real cluster storage system as a first mapped cluster, according to the first mapped cluster scheme, based on a criterion of the real cluster storage system;

allocating, contemporaneous with the first mapped cluster, second storage space of the real cluster storage system as a second mapped cluster based on a second mapped cluster scheme; and providing information enabling a data operation corresponding to the first mapped cluster to occur based on the first mapped cluster scheme.

18. The non-transitory computer-readable medium of claim 17, wherein the first storage device is comprised in a first hardware data storage node of the real cluster storage system.

19. The non-transitory computer-readable medium of claim 18, wherein the second storage device is comprised in the first hardware data storage node of the real cluster storage system.

20. The non-transitory computer-readable medium of claim 18, wherein the second storage device is comprised in a second hardware data storage node of the real cluster storage system, and wherein the second hardware data storage node is a different hardware data storage node than the first hardware data storage node.

* * * * *